(12) United States Patent
Mitarai et al.

(10) Patent No.: US 7,894,666 B2
(45) Date of Patent: Feb. 22, 2011

(54) IMAGE PROCESSING METHOD AND APPARATUS, IMAGE SENSING APPARATUS, AND PROGRAM

(75) Inventors: Yusuke Mitarai, Tokyo (JP); Masakazu Matsugu, Yokohama (JP); Katsuhiko Mori, Kawasaki (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1091 days.

(21) Appl. No.: 11/571,325

(22) PCT Filed: Jul. 27, 2005

(86) PCT No.: PCT/JP2005/014143
§ 371 (c)(1),
(2), (4) Date: Dec. 27, 2006

(87) PCT Pub. No.: WO2006/011635
PCT Pub. Date: Feb. 2, 2006

(65) Prior Publication Data
US 2009/0169101 A1   Jul. 2, 2009

(30) Foreign Application Priority Data
Jul. 30, 2004 (JP) .............. 2004-223577
Jul. 30, 2004 (JP) .............. 2004-223579

(51) Int. Cl.
*G06K 9/00* (2006.01)
(52) U.S. Cl. ..................... 382/167
(58) Field of Classification Search .......... 382/162, 382/167, 203, 282–283, 274–275, 117–118; 348/224.1–225, 576–580; 358/518–523
See application file for complete search history.

(56) References Cited

U.S. PATENT DOCUMENTS

| | | | |
|---|---|---|---|
| 6,292,574 B1 * | 9/2001 | Schildkraut et al. | 382/117 |
| 6,463,176 B1 | 10/2002 | Matsugu et al. | 382/195 |
| 6,631,208 B1 * | 10/2003 | Kinjo et al. | 382/167 |
| 6,895,112 B2 * | 5/2005 | Chen et al. | 382/167 |
| 6,907,140 B2 | 6/2005 | Matsugu et al. | 382/195 |
| 7,116,820 B2 * | 10/2006 | Luo et al. | 382/167 |

(Continued)

FOREIGN PATENT DOCUMENTS

EP    1 429 537 A2    6/2004

(Continued)

OTHER PUBLICATIONS

European Search Report dated Sep. 17, 2009, in application No. 05768840.0-1522 / 1774466 (PCT JP2005014143).

(Continued)

*Primary Examiner*—Sherali Ishrat
(74) *Attorney, Agent, or Firm*—Fitzpatrick, Cella, Harper & Scinto

(57) ABSTRACT

An eye region is extracted from an input image. A poor pupil hue quality region is extracted from the eye region. A high brightness region is extracted from the poor pupil hue quality region. A region obtained by excluding the high brightness region from the poor pupil hue quality region is extracted as a red-eye region. The high brightness region is corrected by using a method different from that for the red-eye region.

30 Claims, 43 Drawing Sheets

U.S. PATENT DOCUMENTS

| | | | |
|---|---|---|---|
| 7,127,108 B2 * | 10/2006 | Kinjo et al. | 382/203 |
| 7,155,058 B2 * | 12/2006 | Gaubatz et al. | 382/167 |
| 7,599,577 B2 * | 10/2009 | Ciuc et al. | 382/275 |
| 2001/0022853 A1 | 9/2001 | Takaoka | 382/167 |
| 2003/0007687 A1 | 1/2003 | Nesterov et al. | 382/167 |
| 2003/0068084 A1 | 4/2003 | Kinjo et al. | 382/164 |

FOREIGN PATENT DOCUMENTS

| | | |
|---|---|---|
| JP | 2735028 | 1/1996 |
| JP | 10-75374 | 3/1998 |
| JP | 10-91761 | 4/1998 |
| JP | 2000-076427 | 3/2000 |
| JP | 2000-134486 | 5/2000 |
| JP | 3078166 | 6/2000 |
| JP | 2001-61071 | 3/2001 |
| JP | 2004-208132 | 7/2004 |
| JP | 2005-222152 | 8/2005 |
| WO | WO 03/026278 | 3/2003 |

OTHER PUBLICATIONS

Gaubatz M et al: "Automatic red-eye detection and correction", Proceedings / 2002 International Conference on Image Processing : Sep. 22-25, 2002, Rochester, New York, USA, IEEE Operations Center, Piscataway, NJ, vol. 1, Sep. 22, 2002, pp. 804-807, XP010607446, ISBN: 978-0-7803-7622-9.

LeCun et al., "Convolutional Networks for Images, Speech, and Time Series", *The Handbook of Brain Theory and Neural Networks*, pp. 255-258, 1995.

Japanese Office Action issued Oct. 13, 2009, in Japanese Patent Application No. 2004-223579.

* cited by examiner

F I G. 17
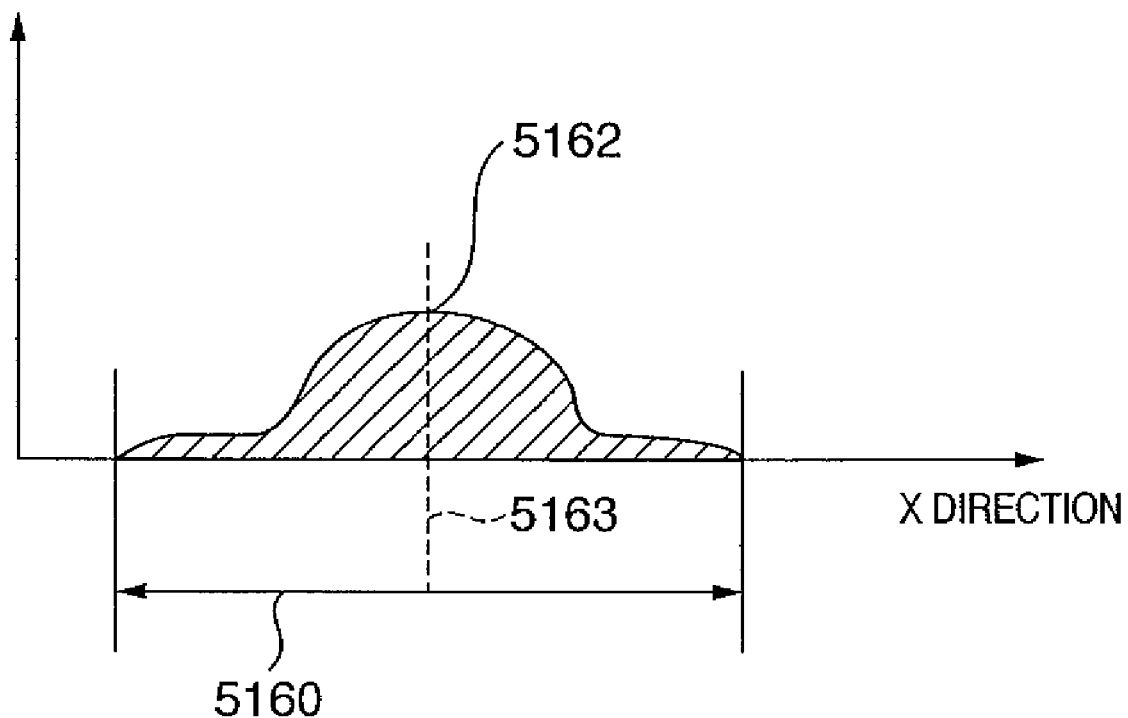

F I G. 24
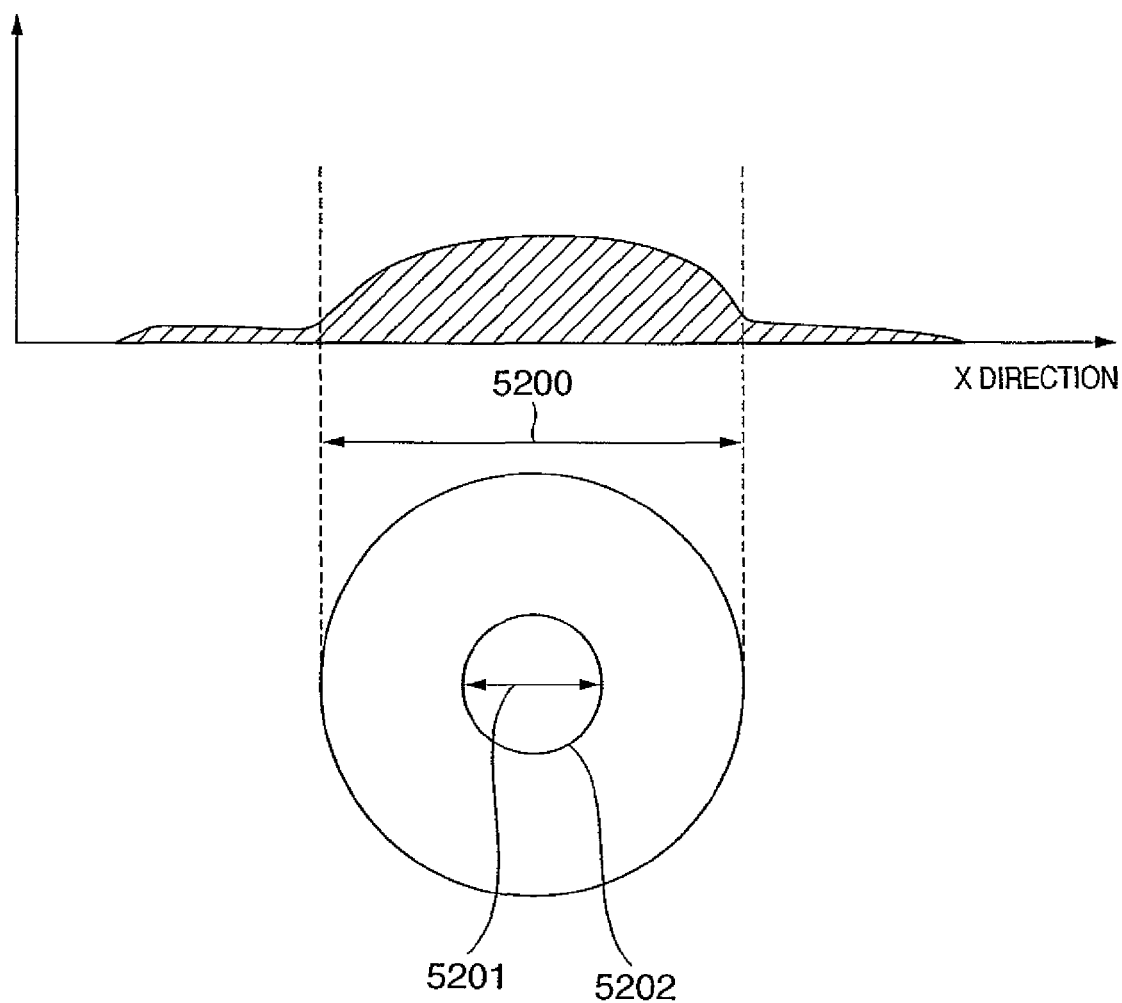

IMAGE PROCESSING METHOD AND APPARATUS, IMAGE SENSING APPARATUS, AND PROGRAM

TECHNICAL FIELD

The present invention relates to an image processing apparatus and method which corrects a poor pupil hue quality represented by a red-eye occurred in flash photography.

BACKGROUND ART

As a conventionally known phenomenon, when an object such as a person in a dark place is sensed by an image sensing apparatus such as a camera while using flashlight irradiation, a poor pupil hue quality occurs due to retina reflection of the object so that the pupil is sensed in red or gold.

As a poor pupil hue quality correction method, a method of causing an operator to designate a red-eye region in an image and changing the data correction amount in the red-eye region in accordance with the position in it has been proposed (e.g., Japanese Patent Laid-Open No. 2000-134486). Another method has been proposed in which a sensed image is displayed, a predetermined region including eyes in the image is designated manually, a red-eye or gold-eye is extracted from the designated region, and the extracted red-eye or gold-eye is corrected (e.g., Japanese Patent Laid-Open No. 2001-61071).

In these prior arts, however, the image of the corrected region may be unnatural. In addition, the operator's operation is cumbersome because of the necessity of region designation.

It is an object of the present invention to provide a correction method of easily correcting the above-described poor pupil hue quality such as a red-eye or gold-eye occurred in flash photography to a more natural pupil image without any poor pupil hue quality.

An image processing apparatus which sets catch light to produce a more natural image has also conventionally been proposed (e.g., Japanese Patent Laid-Open Nos. 10-91761 and 10-75374).

In Japanese Patent Laid-Open No. 10-91761, the red-eye portion of a photo image is designated, and the position of catch light is designated in the designated red-eye portion. Designation of an eye region and a catch light position is manually done by the operator.

In Japanese Patent Laid-Open No. 10-75374, when the operator designates a region including an eye region, the eye region is extracted from the designated region, and catch light in the extracted eye region is determined. If the catch light is weak, it is enhanced. Designation of the region including the eye region is manually done by the operator.

In these prior arts, however, since the operator manually designates the face/eye region or the catch light position/size in the image in catch light setting, the operator's operation is cumbersome. The image correction accuracy largely depends on the operator's operation.

It is another object of the present invention to easily set appropriate catch light.

DISCLOSURE OF INVENTION

In order to achieve an object of the present invention, for example, an image processing method of the present invention comprises the following arrangement.

That is, an image processing method characterized by comprising:
an input step of inputting an image;
a poor pupil hue quality region extraction step of extracting a poor pupil hue quality region from the image;
a high brightness region extraction step of extracting a high brightness region from the poor pupil hue quality region;
a red-eye region correction step of determining, as a red-eye region, a region obtained by excluding the high brightness region from the poor pupil hue quality region and correcting the red-eye region; and
a high brightness region correction step of correcting the high brightness region by using a method different from that in the red-eye region correction step.

In order to achieve an object of the present invention, for example, an image processing method of the present invention comprises the following arrangement.

That is, an image processing method characterized by comprising:
an eye region extraction step of extracting an eye region from an image including an eye;
a center determination step of determining a center of the eye;
a low brightness pixel extraction step of extracting a low brightness pixel having a brightness of not more than a predetermined threshold value from the eye region;
a shape determination step of determining whether a connected component of the extracted low brightness pixel has a first predetermined shape;
a position determination step of, when the connected component has the first predetermined shape, determining whether the center of the eye is located at a predetermined position with respect to the connected component; and
a pupil region extraction step of, when the center of the eye is located at the predetermined position, extracting, as a pupil region of the eye, a region having a second predetermined shape determined by the shape of the connected component.

In order to achieve an object of the present invention, for example, an image processing apparatus of the present invention comprises the following arrangement.

That is, an image processing apparatus characterized by comprising:
input means for inputting an image;
poor pupil hue quality region extraction means for extracting a poor pupil hue quality region from the image;
high brightness region extraction means for extracting a high brightness region from the extracted poor pupil hue quality region;
red-eye region correction means for determining, as a red-eye region, a region obtained by excluding the high brightness region from the poor pupil hue quality region and correcting the red-eye region; and
high brightness region correction means for correcting the high brightness region by using a method different from that of the red-eye region correction means.

In order to achieve an object of the present invention, for example, an image processing apparatus of the present invention comprises the following arrangement.

That is, an image processing apparatus characterized by comprising:
eye region extraction means for extracting an eye region from an image including an eye;
center determination means for determining a center of the eye;
low brightness pixel extraction means for extracting a low brightness pixel having a brightness of not more than a predetermined threshold value from the eye region;

shape determination means for determining whether a connected component of the extracted low brightness pixel has a first predetermined shape;

position determination means for, when the connected component has the first predetermined shape, determining whether the center of the eye is located at a predetermined position with respect to the connected component; and pupil region extraction means for, when the center of the eye is located at the predetermined position, extracting, as a pupil region of the eye, a region having a second predetermined shape determined by the shape of the connected component.

In order to achieve an object of the present invention, for example, an image sensing apparatus of the present invention comprises the following arrangement.

That is, an image sensing apparatus characterized by comprising:

image generation means for generating an object image; and an image processing apparatus of claim 31 or 32, wherein a poor pupil hue quality in the object image generated by the image generation means is corrected by the image processing apparatus.

In order to achieve an object of the present invention, for example, an image processing method of the present invention comprises the following arrangement.

That is, an image processing method characterized by comprising:

an input step of inputting an image;

a face image generation parameter extraction step of extracting a predetermined face image generation parameter by analyzing the input image; and a catch light setting step of setting catch light in the image on the basis of the parameter extracted in the face image generation parameter extraction step.

In order to achieve an object of the present invention, for example, an image processing apparatus of the present invention comprises the following arrangement.

That is, an image processing apparatus characterized by comprising:

input means for inputting an image;

face image generation parameter extraction means for extracting a predetermined face image generation parameter by analyzing the input image; and catch light setting means for setting catch light in the image on the basis of the parameter extracted by the face image generation parameter extraction means.

In order to achieve an object of the present invention, for example, an image sensing apparatus of the present invention comprises the following arrangement.

That is, an image sensing apparatus characterized by comprising:

image sensing means; and an image processing apparatus of claim 49, wherein the image processing apparatus sets catch light in an image sensed by the image sensing means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 17 is a graph showing the horizontal histogram in the eye region when the face is directed to the front;

FIG. 24 is a graph showing the relationship between the horizontal histogram in the eye region and the catch light size;

BEST MODE FOR CARRYING OUT THE INVENTION

Preferred embodiments of the present invention will now be described in detail in accordance with the accompanying drawings.

First Embodiment

As the first embodiment, an image processing apparatus will be described, which receives an image containing a human face with a poor pupil hue quality as input image data and corrects the poor pupil hue quality in the image. In this embodiment, a human pupil is handled as a poor pupil hue quality correction target. However, this poor pupil hue quality correction method can be applied not only to a human but also an animal such as a dog.

Figure 1:
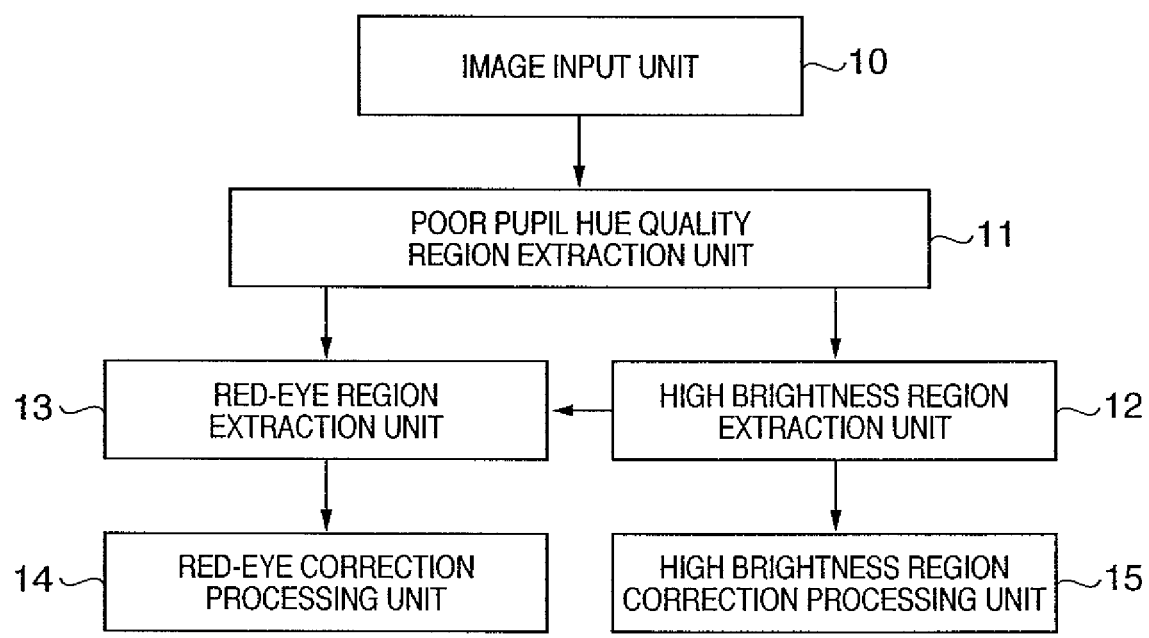
FIG. 1 is a block diagram showing the functional arrangement of an image processing apparatus according to the first embodiment.
Figure 2:
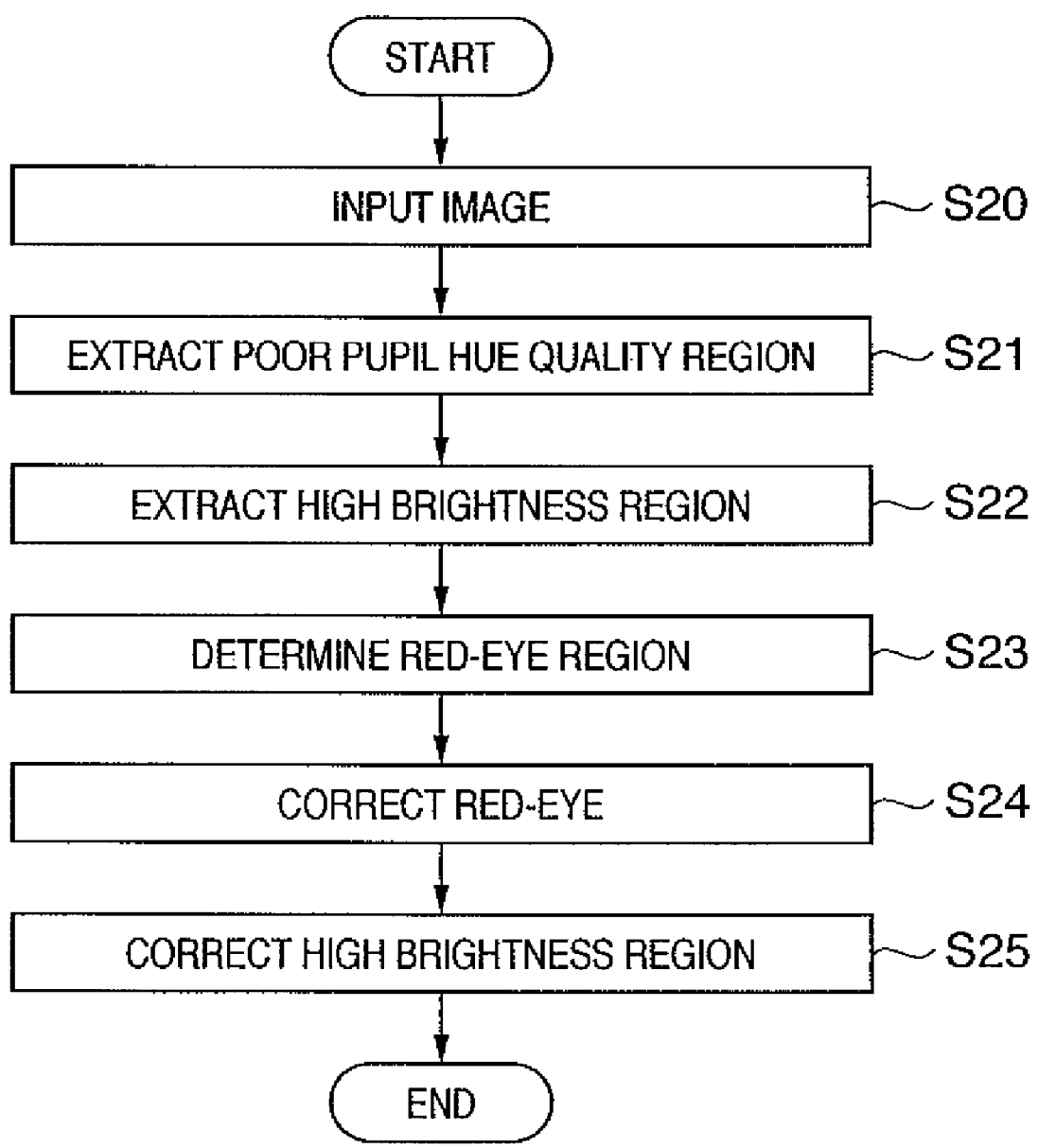
FIG. 2 is a flowchart showing the processing procedures according to the first embodiment.

FIG. 1 shows the functional arrangement of the image processing apparatus according to this embodiment. FIG. 2 is a flowchart of poor pupil hue quality correction processing. The outline of poor pupil hue quality correction processing according to this embodiment will be described with reference to FIGS. 1 and 2.

An image input unit 10 is a module to input an image as a poor pupil hue quality correction target. The image input unit 10 inputs image data (step S20). A poor pupil hue quality region extraction unit 11 extracts a poor pupil hue quality region in the input image (step S21). A high brightness region extraction unit 12 extracts pixels having a predetermined brightness value or more from the poor pupil hue quality region extracted by the poor pupil hue quality region extraction unit 11, thereby extracting a high brightness region in the poor pupil hue quality region (step S22).

A red-eye region extraction unit 13 is a module to extract a region to be corrected as a red-eye region. The red-eye region extraction unit 13 extracts, as a red-eye region, from the poor pupil hue quality region extracted by the poor pupil hue quality region extraction unit 11, a region excluding the high brightness region extracted by the high brightness region extraction unit 12 (step S23).

A red-eye correction processing unit 14 is a module to correct the red-eye region extracted by the red-eye region extraction unit 13. The red-eye correction processing unit 14 executes predetermined correction for each pixel of the input image in the red-eye region extracted by the red-eye region extraction unit 13 (step S24).

A high brightness region correction processing unit 15 is a module to correct the high brightness region extracted by the high brightness region extraction unit 12. The high brightness region correction processing unit 15 executes predetermined correction different from that of the red-eye correction processing unit 14 for each pixel of the input image in the high brightness region (step S25). With this correction, a poor pupil hue quality such as a red-eye or gold-eye can be corrected to a more natural pupil image without any poor pupil hue quality.

Figure 3:
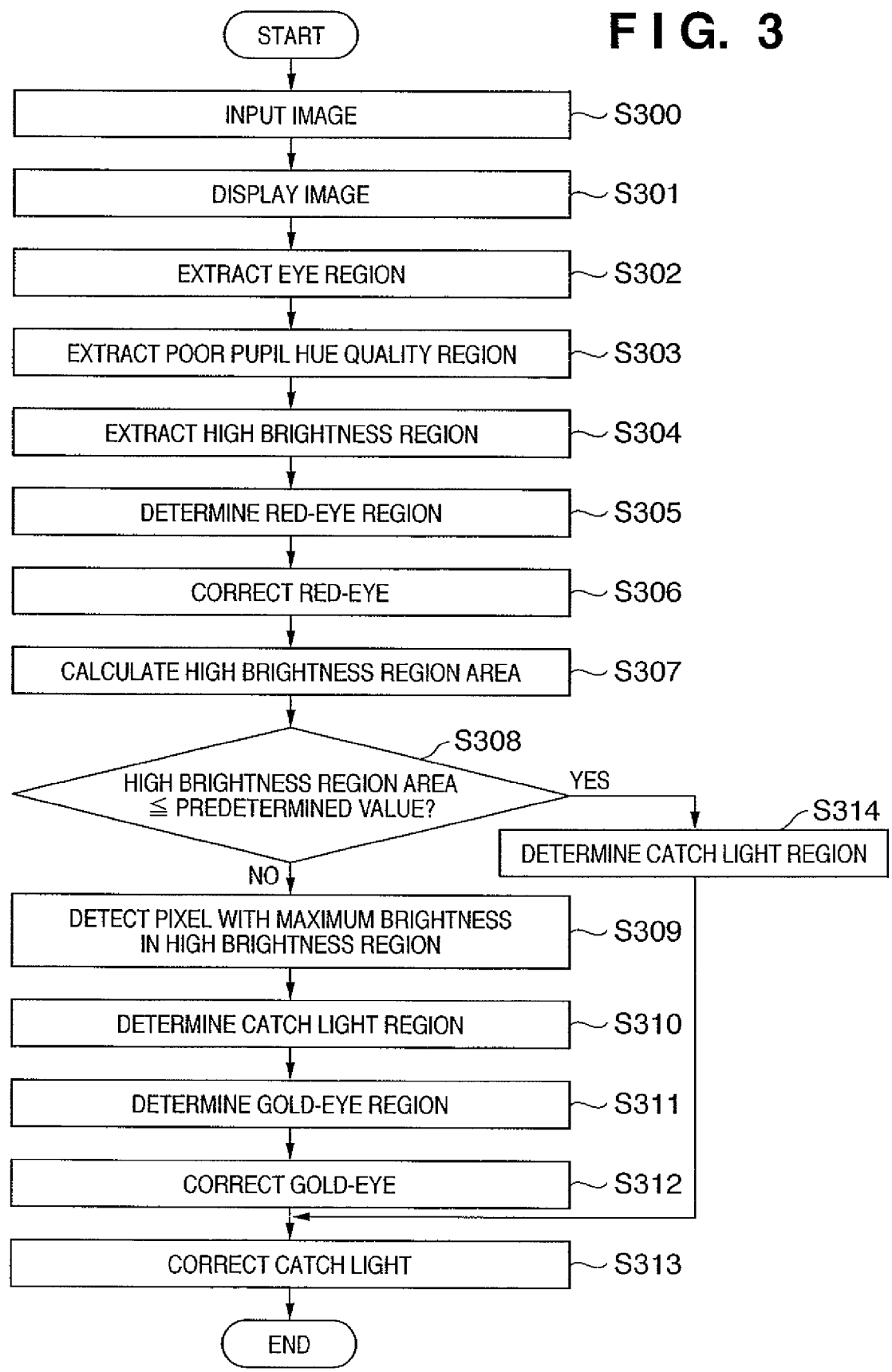
FIG. 3 is a flowchart showing poor pupil hue quality correction processing procedures.

FIG. 3 is a flowchart showing detailed processing procedures of correcting a poor pupil hue quality of a human pupil in an image. The poor pupil hue quality correction method will be described below in detail with reference to FIG. 3.

In image input (step S300), image data to be subjected to poor pupil hue quality correction is input. In image display (step S301), the input image data is displayed as an image.

In eye region extraction (step S302), a rough eye region is extracted from the displayed image. The eye region can be designated manually by using, e.g., a pointing device. Alternatively, the eye region may automatically be extracted from the input image by using a known pattern recognition technology such as template matching. In this embodiment, a pointing device is dragged from the vicinity of a pupil to a point outside the eye, thereby extracting, as an eye region, a circular or oval region containing an eye and having its center near the pupil. The eye region extracted here is the target region of subsequent correction processing.

Figure 4:
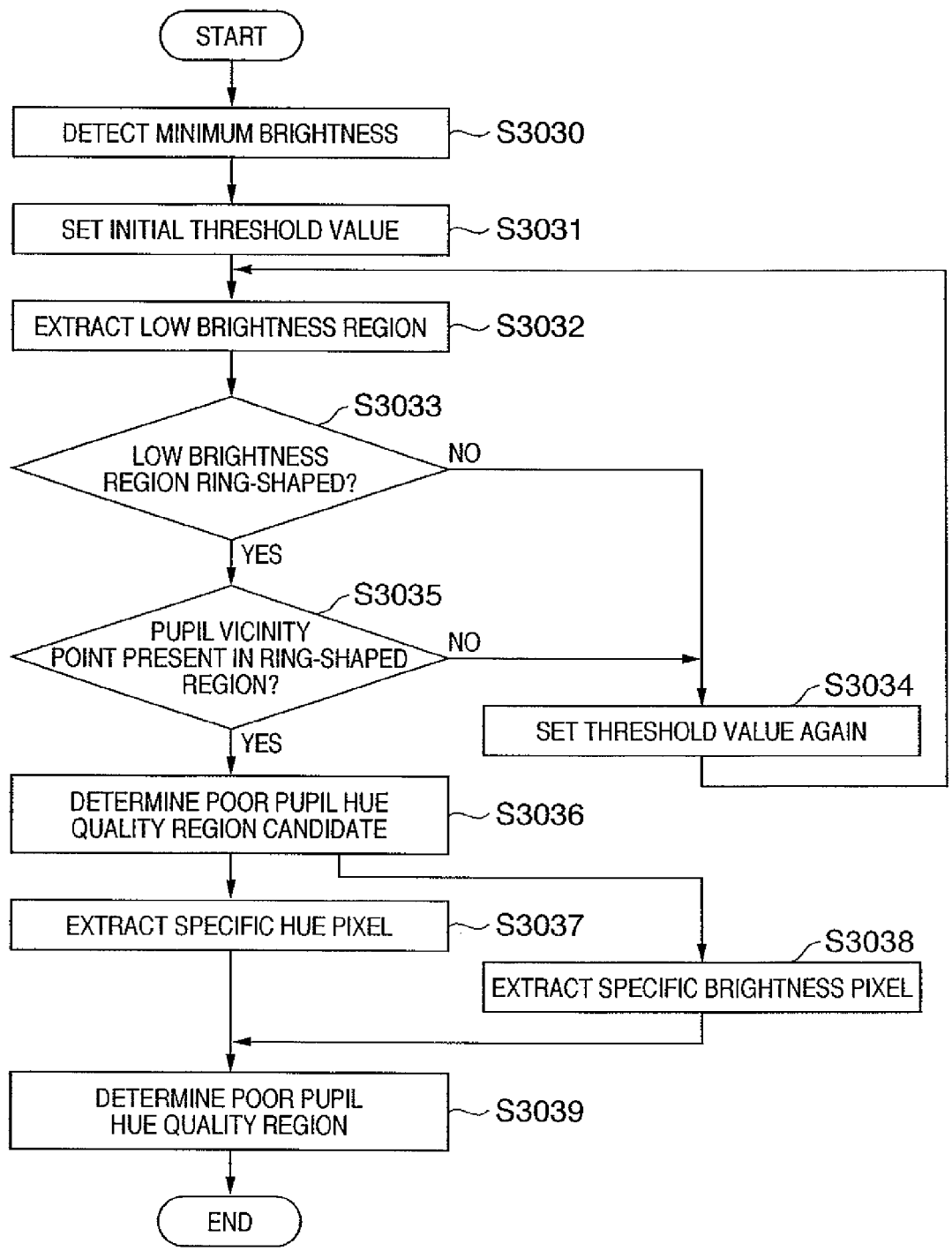
FIG. 4 is a flowchart showing poor pupil hue quality region extraction processing procedures.

In poor pupil hue quality region extraction (step S303), a poor pupil hue quality region is extracted from the extracted eye region. In this example, a region where a red-eye or gold-eye as a typical poor pupil hue quality has occurred is extracted. FIG. 4 is a flowchart showing the poor pupil hue quality region extraction processing procedures according to this embodiment. Poor pupil hue quality region extraction according to this embodiment will be described below with reference to FIG. 4.

In minimum brightness value detection (step S3030), a minimum value Vmin of the brightness values of the pixels in the eye region is detected. In initial threshold value setting (step S3031), an initial threshold value P_Th to be used for threshold processing in next low brightness region extraction (step S3032) is determined on the basis of the minimum brightness value detected in the minimum brightness value detection (step S3030). The initial threshold value P_Th is set to, e.g. P_Th=Vmin+b or P_Th=η*Vmin (b and η are positive constants). The constant b or η is set in advance. A low brightness region extracted in the first low brightness region extraction (step S3032) is preferably small. Hence, b or η is set to be relatively small.

In the low brightness region extraction (step S3032), low brightness region extraction is executed, in which by using the threshold value set in the initial threshold value setting (step S3031) or threshold value re-setting (step S3034) to be described later, pixels having brightness values equal to or smaller than the threshold value are extracted.

In ring shape determination branch (step S3033), it is determined whether a ring-shaped region is included in the low brightness regions which are extracted from the eye region in the low brightness region extraction (step S3032). The processing flow branches depending on the result of the determination. That an extracted region is ring-shaped indicates that the extracted region has the shape of a white region shown in FIG. 5A or 5B. This shape will simply be referred to as a ring hereinafter.

Figure 5A:
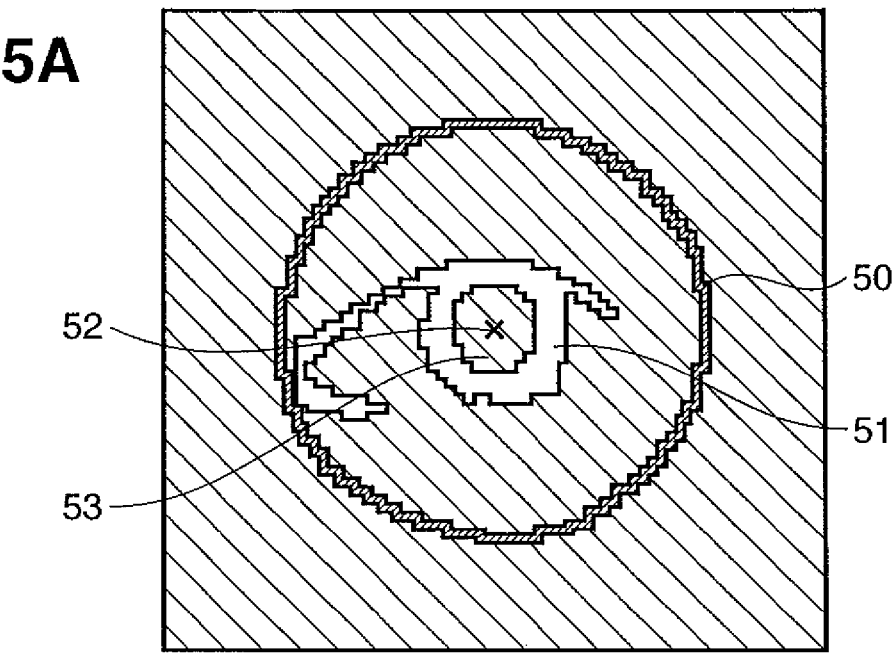
FIGS. 5A and 5B are views showing low brightness region extraction results.
Figure 5B:
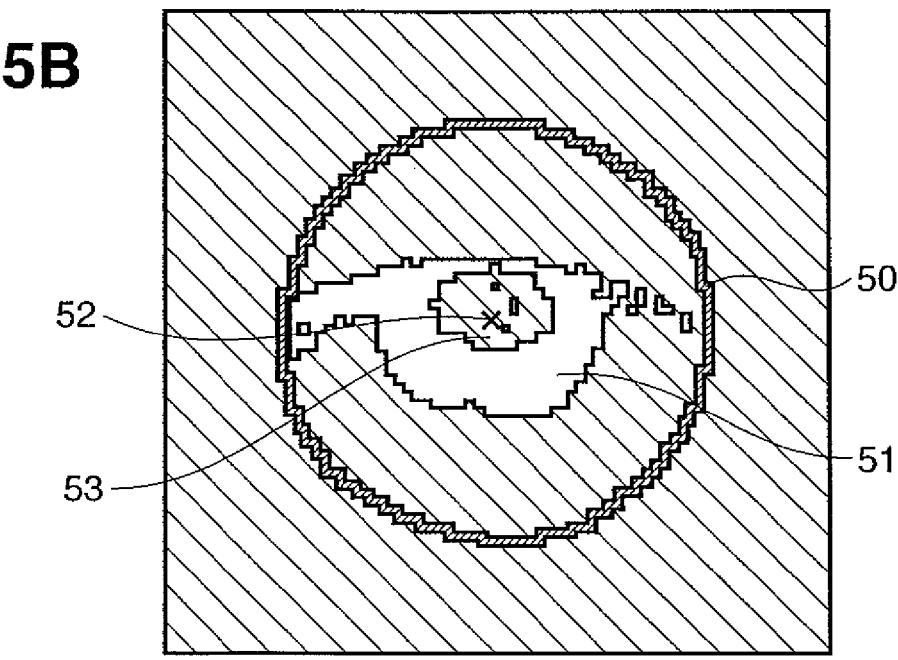

A gray circle 50 in FIG. 5A or 5B indicates the outer periphery of the eye region selected in the above-described eye region extraction (step S302). A white region 51 indicates a low brightness region in the eye region, which is extracted in the low brightness region extraction (step S3032). A cross 52 in FIG. 5A or 5B indicates a position designated as the vicinity of a pupil, i.e., the vicinity of a pupil (the drag starting point of the pointing device) designated in the eye region extraction (step S302). This point will simply be referred to as a pupil vicinity point hereinafter.

A black region 53 will be referred to as a region inside the ring (to be described later). In this ring shape determination branch (step S3033), if no ring is present, the flow advances to threshold value re-setting (step S3034). If a ring is present, the flow advances to intra-ring pupil determination branch (step S3035).

The method of determining in the ring shape determination branch (step S3033) whether a ring is present will be described below. For non-low-brightness pixels except the pixels extracted as low brightness regions, all connected pixels, i.e., connected components are assigned the same label, and different connected components are assigned different brightness regions are extracted. Of the labeled connected components, connected components totally surrounded by a low brightness region are detected. If such connected components totally surrounded by a low brightness region are detected, a ring is present. If no such connected components are detected, no ring is present. In this way, whether a ring is present is determined. Of the connected components totally surrounded by a low brightness region, a component having an area smaller than a predetermined value may be neglected. As the predetermined area, a preset constant may be used. Alternatively, a value proportional to the area of the eye region selected in the eye region extraction (step S302) may be used. In this embodiment, whether a ring is present is determined by the above-described processing. However, the present invention is not particularly limited to this, and any other method can be used.

If it is determined in the ring shape determination branch (step S3033) that no ring is present, the flow advances to threshold value re-setting (step S3034) to set the threshold value to be used in the low brightness region extraction (step S3032) again. In the threshold value re-setting (step S3034), the threshold value is set again such that the number of pixels to be extracted as a low brightness region becomes larger than that for the threshold value used in the immediately preceding low brightness region extraction (step S3032). For example, let Th_Old be the threshold value used in the immediately preceding low brightness region extraction (step S3032), and Th_New be the threshold value to be set again. The threshold value is set again to Th_New=Th_Old+Δb or Th_New=Δη*Th_Old (Δb and Δη are positive constants). When the threshold value is set again, and the low brightness region extraction (step S3032) and ring shape determination branch (step S3033) are looped, an appropriate low brightness region can be extracted.

If a ring is detected in the ring shape determination branch (step S3033), the flow advances to intra-ring pupil determination branch (step S3035). It is determined for each ring detected in the ring shape determination branch (step S3033) whether a pupil vicinity point is present in the region inside the ring. The processing flow branches depending on the result. The region inside the ring corresponds to the labeled connected components in the ring shape determination branch (step S3033). That is, the region inside the ring indicates a low brightness region which is present in contact with the inside of the ring. If a pupil vicinity point is present in this region, the flow advances to poor pupil hue quality candidate region determination (step S3036). If no pupil vicinity point is present, the flow returns to the threshold value re-setting (step S3034) to execute loop processing. The ring which is determined here to have a pupil vicinity point in its internal region will be referred to as a candidate ring hereinafter.

In the poor pupil hue quality candidate region determination (step S3036), a poor pupil hue quality candidate region to be subjected to the next processing, i.e., specific hue pixel extraction (step S3037) and specific brightness pixel extraction (step S3038) is determined. A region containing the low brightness region in contact with the inside of the candidate ring is set as an initial count region. The number of low brightness pixels extracted in the low brightness region extraction (step S3032) in the initial count region is counted. In addition, the circularity level of the region is calculated.

The connected components of the candidate ring, i.e., the outer periphery of the count region is gradually extended without crossing over the low brightness pixel region. The number of low brightness pixels and circularity level are calculated for every extension. Letting S be the area of the count region, and L be the outer periphery length of the count region the circularity level is calculated by $S/L^2$. The circularity level calculation method is not particularly limited to this, and any other method capable of obtaining a high circularity level for a smooth outer periphery can be used. The number of low brightness pixels and circularity level are evaluated by appropriate weighting determined in advance. The count region corresponding to the maximum evaluation value is determined as the poor pupil hue quality candidate region.

With the above processing, a region which matches the rough pupil region and does not contain the white-of-eye portion or the flesh color portion of the eyelid can be extracted as a poor pupil hue quality candidate region. When the outer periphery of the count region is extended without crossing over the low brightness region, a region inside the ring, which is different from the region inside the ring with the pupil vicinity point, may pose a problem in processing. Such a region is neglected or defined as low brightness pixels in advance. With the above processing, the poor pupil hue quality candidate containing no write portion or flesh color portion can be determined. Any other method capable of determining such an appropriate region can be used.

Next, in the specific hue pixel extraction (step S3037) and specific brightness pixel extraction (step S3038), poor pupil hue quality pixels in the poor pupil hue quality candidate region determined in the poor pupil hue quality region candidate determination (step S3036) are extracted. In the specific hue pixel extraction (step S3037), a pixel whose hue falls within a hue range unique to a red-eye, i.e., whose hue is close to red is extracted as a red-eye pixel. In the specific brightness pixel extraction (step S3038), a pixel whose brightness is unique to a gold-eye, i.e., whose brightness value is higher than the upper-limit brightness value recognizable as a black eye is extracted as a high brightness pixel.

In this embodiment, poor pupil hue quality pixels are extracted by the above-describe method. Poor pupil hue quality pixels may be extracted by using a component such as a hue, chroma, or lightness unique to them. A method disclosed in patent reference 2 described in the background of the invention, i.e., a method of comparing the chromaticity of each pixel of red and green components with the average chromaticity in a predetermined region may be used.

In poor pupil hue quality region determination (step S3039), a poor pupil hue quality region to be corrected is determined. An oval or circular region which has a minimum area and contains all red-eye pixels and high brightness pixels extracted in the specific hue pixel extraction (step S3037) and specific brightness pixel extraction (step S3038) is set. A range in the oval or circular region, which is smaller than the poor pupil hue quality candidate region determined in the poor pupil hue quality region candidate determination (step S3036), is determined as the poor pupil hue quality region.

As described above, when an oval or circular region is set as a correction target region, the poor pupil hue quality region can be corrected without any sense of incompatibility (a patch pattern in the pupil) which is generated when only extracted red-eye pixels or high brightness pixels are corrected. When an oval or circular region is set as a correction region, the correction region may extend to the white-of-eye or the flesh color portion of the eyelid. However, the white-of-eye or flesh color portion can be prevented from being erroneously corrected when a range smaller than the poor pupil hue quality candidate region determined in the poor pupil hue quality region candidate determination (step S3036) is set as a correction target.

The poor pupil hue quality region extraction processing in the poor pupil hue quality region extraction (step S303) has been described above. In this embodiment, the poor pupil hue quality region is extracted by using the above-described method. Any other method capable of extracting the poor pupil hue quality region can be used.

When the poor pupil hue quality region extraction (step S303) is executed, the flow advances to high brightness region extraction (step S304). In this processing, a high brightness region corresponding to a gold-eye or catch light in the poor pupil hue quality region is extracted. For this high brightness region extraction, the processing result in the specific brightness pixel extraction (step S3038) in the poor pupil hue quality region extraction (step S303) may directly be used. Alternatively, high brightness pixels may be extracted by using a newly set value. Thus extracted high brightness pixels are extracted as a high brightness region.

In red-eye region determination (step S305), a red-eye region to be corrected as a red-eye is determined. A region obtained by excluding the high brightness region extracted in the high brightness region extraction (step S304) from the poor pupil hue quality region extracted in the poor pupil hue quality region extraction (step S303) is determined as a red-eye region.

The pixels in the region determined as the red-eye region are subjected to red-eye correction processing (step S306). In this embodiment, as the red-eye correction processing, the brightness and chroma are simply reduced. Alternatively, the red component in the red-eye may be eliminated by, e.g., analyzing a region obtained by excluding the poor pupil hue quality region extracted in the poor pupil hue quality region extraction (step S303) from the poor pupil hue quality candidate region extracted in the poor pupil hue quality region candidate determination (step S3036), extracting parameters for correction, including the average hue, chroma, lightness, or chromaticity in the region, and correcting the region such that the parameters of each pixel to be corrected almost equals the extracted parameters. Any other method capable of executing correction to obtain an appropriate color or brightness of a black eye can be used.

With the above processing, red-eye correction is ended. When correction processing different from the red-eye correction is executed for the high brightness region extracted in the high brightness region extraction (step S304) subsequently, more natural correction can be executed. The subsequent correction processing for the high brightness region will be described below.

In high brightness region area calculation (step S307), the labeling processing described in the ring shape determination branch (step S3033) is executed for the high brightness region extracted in the high brightness region extraction (step S304) to calculate the area of each of all connected components.

In area determination branch (step S308), it is determined whether the area of each connected component has a predetermined value or more. The processing flow branches for each connected component. The predetermined area value can be a predetermined constant. Preferably, a value proportional to the area of the poor pupil hue quality candidate region determined in the poor pupil hue quality region candidate determination (step S3036) in the poor pupil hue quality region extraction (step S303), i.e., the area of the rough pupil is used as the predetermined value. For example, the predetermined area value used here is set to about 10% of the area of the poor pupil hue quality candidate region (i.e., the pupil area).

In the area determination branch (step S308), for a connected component in which the high brightness region area has a predetermined value or less, the flow advances to catch light region determination (step S314). For a connected component in which the high brightness region area has a predetermined value or more, it is determined that a gold-eye is generated, and the flow advances to intra-high-brightness-region maximum brightness pixel detection (step S309).

First, processing for a connected component for which the high brightness region area is determined to have a predetermined value or less, i.e., processing which directly advances to the catch light region determination (step S314) will be described. In the catch light region determination (step S314), the region of the connected component for which the high brightness region area is determined to have a predetermined value or less is simply determined as a catch light region.

The region determined as the catch light region is subjected to catch light correction processing (step S313). In this embodiment, the catch light correction processing is done by simply reducing the chroma. With this processing, the poor pupil hue quality can be corrected while maintaining catch light at a natural position. In this embodiment, only chroma reduction is performed. However, any other correction method capable of ensuring natural catch light region can be used.

For a connected component for which the high brightness region area is determined to have a predetermined value or more, a pixel having a maximum brightness value in the connected component is detected in the intra-high-brightness-region maximum brightness pixel detection (step S309). In catch light region determination (step S310), a region having a predetermined shape and, as its center, the pixel with the maximum brightness value detected in the intra-high-brightness-region maximum brightness pixel detection (step S309) is determined as a catch light region.

In this embodiment, as the predetermined shape, a circular shape having an area proportional to the area of the poor pupil hue quality region determined in the poor pupil hue quality region candidate determination (step S3036) in the poor pupil hue quality region extraction (step S303) and, for example, an area of about 5% is used. As the predetermined shape, any other shape such as a star shape or a shape having a predetermined area can be used if a natural catch light region can be obtained.

In gold-eye region determination (step S311), a region obtained by excluding, from the connected component, the catch light region determined in the catch light region determination (step S310) is determined as a gold-eye region. The pixels in the determined gold-eye region are subjected to gold-eye correction processing (step S312). As the gold-eye correction processing, the same processing as in the above-described red-eye correction processing (step S306) is executed.

Finally, in catch light correction processing (step S313), the pixels in the catch light region determined in the catch light region determination (step S310 or S314) are subjected to the above-described catch light correction processing.

When the above-described correction processing for the connected components in the high brightness region is executed for all connected components, the high brightness region correction processing is ended. When the processing until the red-eye correction processing (step S306) and the processing from the high brightness region area calculation (step S307) are executed, the method can cope with various kinds of poor pupil hue qualities such as a red-eye and gold-eye, and natural poor pupil hue quality correction can be executed.

In the first embodiment, an example of the method of receiving an image containing a human face with a poor pupil hue quality as input image data and correcting the poor pupil hue quality in the image has been described.

Figure 7:
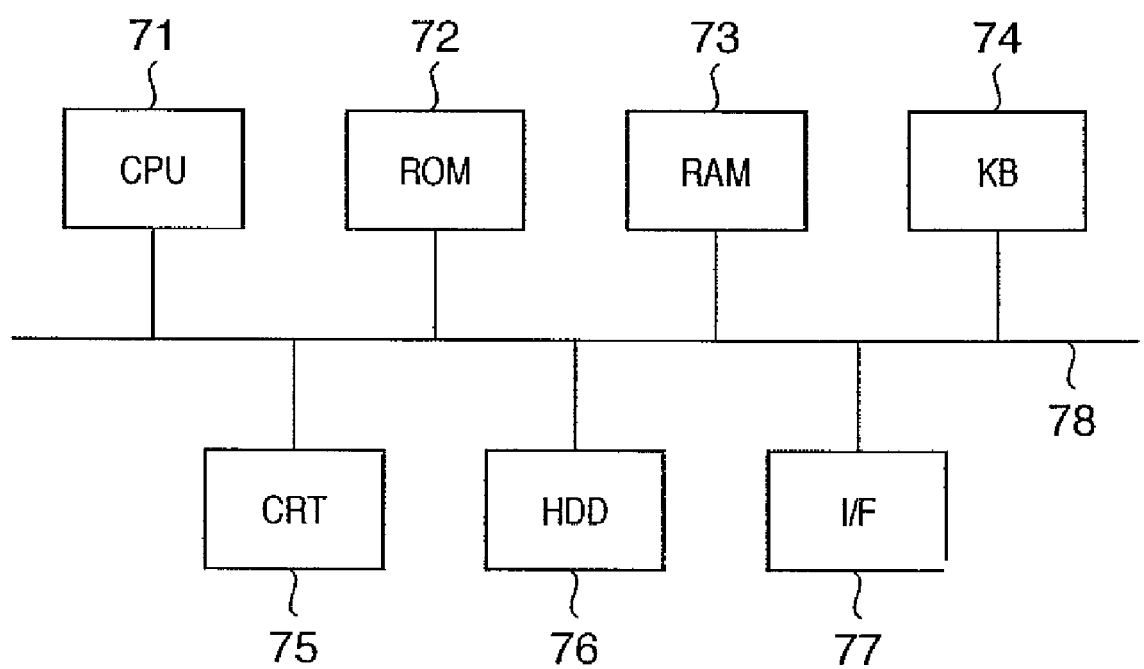
FIG. 7 is a block diagram showing the hardware configuration of the image processing apparatus.

FIG. 7 is a block diagram showing the hardware configuration of the image processing apparatus according to this embodiment. This image processing apparatus is used as part of an image sensing apparatus or connected to an image sensing apparatus to execute the above-described correction processing.

A CPU 71 controls the entire apparatus and also executes each processing to be described later by using programs and data stored in a ROM 72 and RAM 73.

The ROM 72 stores a boot program and set data of the apparatus.

The RAM 73 has a work area necessary for the CPU 71 in executing various kinds of processing. The RAM 73 also has an area to temporarily store the program and data loaded from an HDD 76.

A keyboard 74 is an operation unit capable of inputting various kinds of instructions from the user to the CPU 71. A pointing device such as a mouse may also be provided.

A CRT 75 is a display device capable of displaying a processing result by the CPU 71 by using a text or image. In place of the CRT 75, a liquid crystal display device may be provided.

The hard disk drive device (HDD) 76 is an external mass storage device. The HDD 76 stores the OS (Operating System), or programs and data to cause the CPU 71 to implement the functions of the units shown in FIG. 1. Some or all of them are loaded to the RAM 73 under the control of the CPU 71. The HDD 76 also stores correction data and model data. They are also loaded to the RAM 73, as needed, under the control of the CPU 71. As an external storage device, a CD or DVD drive device may be provided.

An I/F 77 is an interface for data communication with an external device. For example, image data containing a correction target can be input from a digital camera connected to the I/F 77 or downloaded from a computer. The image data is temporarily stored in the RAM 73 and processed by the CPU 71. The above-described units are connected to a bus 78.

Second Embodiment

In the second embodiment of the present invention, an image sensing apparatus which causes a poor pupil hue quality correction apparatus of this embodiment to automatically correct a poor pupil hue quality of a person in a sensed image and records the image will be described.

Figure 6:
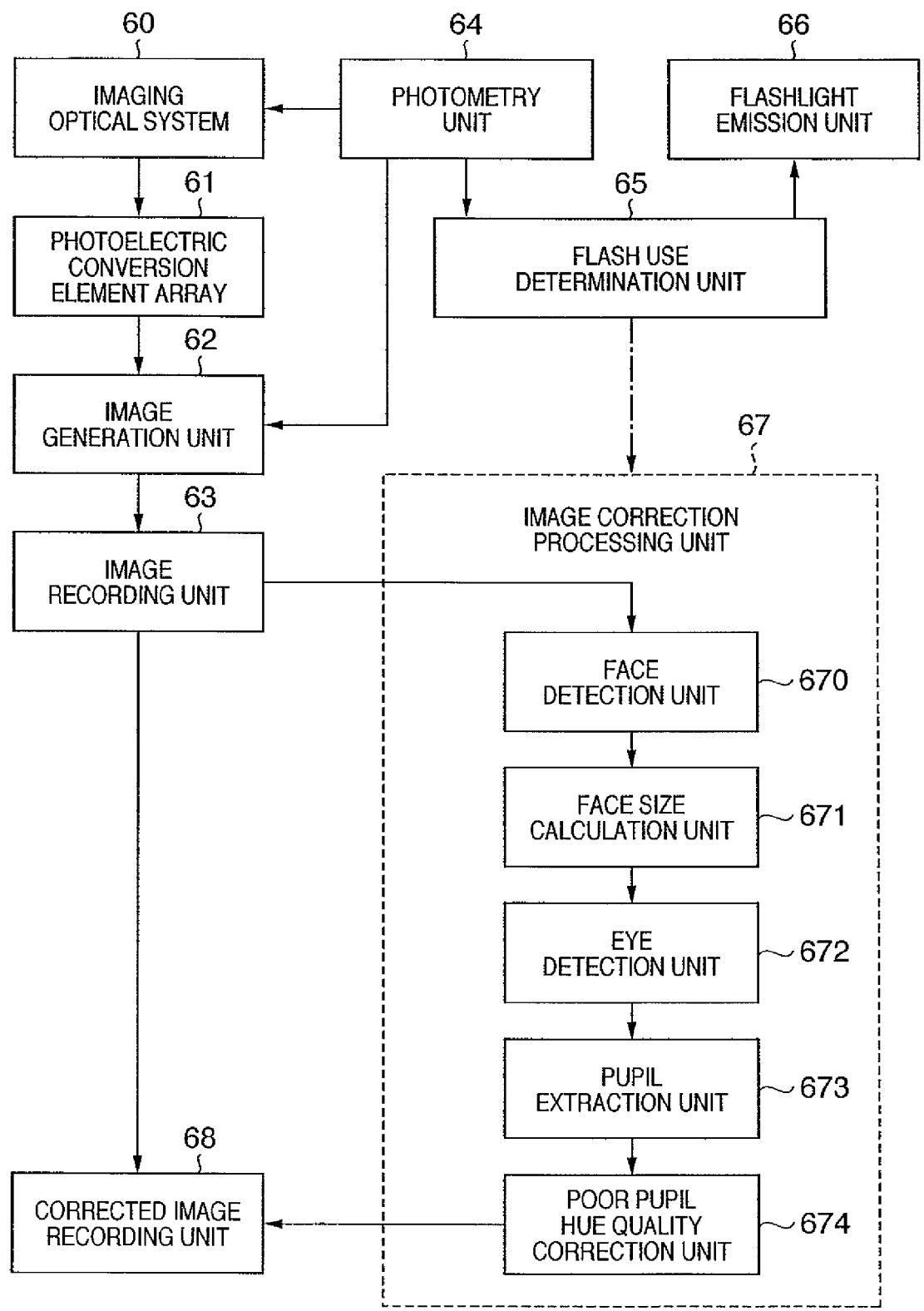
FIG. 6 is a block diagram showing the arrangement of an image sensing apparatus.

FIG. 6 is a block diagram showing the functional arrangement of the image sensing apparatus according to this embodiment. The image sensing apparatus according to the second embodiment will be described below in detail with reference to FIG. 6.

An imaging optical system 60 is an optical system including a lens and stop to form an optical image of an object on a photoelectric conversion element array 61. In the photoelectric conversion element array 61, photoelectric conversion elements such as CCDs are arranged in a two-dimensional array. The optical image formed on the photoelectric conversion element array 61 by the imaging optical system 60 is converted into an electrical signal.

An image generation unit 62 is a processing unit including an AD converter to generate digital image data from the electrical signal converted by the photoelectric conversion element array 61. An image recording unit 63 is a memory which records the digital image data generated by the image generation unit 62.

A photometry unit 64 is a module to measure the brightness of the object. A signal related to the object brightness measured by the photometry unit 64 is sent to the imaging optical system 60, image generation unit 62, and flash use determination unit 65 and used for stop adjustment by the imaging optical system 60, gain control by the image generation unit 62, and flash use determination by the flash use determination unit 65. The photometry unit 64 may be implemented by using the signal from the photoelectric conversion element array 61.

The flash use determination unit 65 is a module to receive the signal related to the object brightness from the photometry unit 64 and determine whether or not a flashlight is to be used. If the brightness of the object has a predetermined value or less, it is determined that flashlight should be used, i.e., flash photography should be executed. If the brightness has a predetermined value or more, it is determined that flashlight should not be used. When the flash use determination unit 65 determines that flashlight should be used, a flashlight use signal is transmitted to a flashlight generation unit and image correction processing unit 67.

A flashlight emission unit 66 including a flashlight source receives the flashlight use determination signal from the flash use determination unit 65 and generates flashlight at the time of image sensing. The image correction processing unit 67 indicated by a dotted line in FIG. 6 is a processing unit which executes poor pupil hue quality correction processing for image data recorded in the image recording unit 63 after image sensing when the flashlight use determination signal is received from the flash use determination unit 65.

When the object is a person, and a poor pupil hue quality is generated, the image correction processing unit 67 generates poor pupil hue quality correction data and sends it to a corrected image recording unit 68.

The corrected image recording unit 68 corrects the image data on the basis of the image data recorded in the image recording unit 63 and the poor pupil hue quality correction data generated by the image correction processing unit 67 and records the resultant corrected image.

The processing by the image correction processing unit 67 and corrected image recording unit 68 will be described below in more detail. Of the processing procedures by the image correction processing unit 67, a description of the same procedures as those described in the first embodiment will be omitted. Only processing procedures different from the first embodiment will be described in detail.

As shown in FIG. 6, the image correction processing unit 67 includes a face detection unit 670, face size calculation unit 671, eye detection unit 672, pupil extraction unit 673, and poor pupil hue quality correction unit 674. The image correction processing unit 67 is a module to receive sensed image data and, when a poor pupil hue quality is generated in a pupil of a person in flashlight photography, generate poor pupil hue quality correction data.

The face detection unit 670 receives image data recorded in the image recording unit 63 and detects a face in the image. To detect a face from the received image data, a method of a personal face image collation apparatus disclosed in Japanese Patent No. 2735028 or an object recognition method disclosed in Japanese Patent No. 3078166 is preferably used. In the former method, a plurality of V-shaped edges having brightness minimums in two different directions are extracted and ANDed to extract face structure points, and collation is executed on the basis of the distance between the structure points. In the latter method, arrangement information of local feature elements is extracted, and collection is executed. Alternatively, template matching simply using a standard face as a template may be used. In place of the above-described methods, any other method capable of determining the presence and position of a face can be used. In this embodiment, a face is detected by simply using template matching at a plurality of resolutions.

The face size calculation unit 671 calculates a rough size of each of all faces detected by the face detection unit 670. To calculate the face size, for example, flesh color extraction is done, and the area of the extracted region is calculated. Alternatively, edge detection is done near the face position to detect the outline of the head portion, and its size is calculated. In this embodiment, the face detection unit 670 executes face detection by using template matching at a plurality of resolutions. Hence, the size of a face is determined depending on at which resolution the face is detected.

The eye detection unit 672 detects eyes in each of all faces detected by the face detection unit 670 on the basis of the face size calculated by the face size calculation unit 671. As in face detection by the face detection unit 670, any method capable of determining the presence and position of an eye can be used to detect an eye. In this embodiment, a template of an eye with an appropriate size proportional to the face size calculated by the face size calculation unit is set, and template matching is executed in a range determined by the face size, where an eye is probably present, thereby detecting an eye.

The pupil extraction unit 673 extracts a pupil portion in each of all eyes detected by the eye detection unit 672. To extract a pupil portion, the processing method from the minimum brightness value detection (step S3030) to the poor pupil hue quality region candidate determination (step S3036) in the poor pupil hue quality region extraction (step S303) of the first embodiment is preferably applied. In the first embodiment, a pupil vicinity point is set as a drag starting point for eye region designation using a pointing device. In the second embodiment, such designation is not done. In this embodiment, a pupil vicinity point is set by using the eye detection result by template matching by the eye detection unit 672. More specifically, a point near a pupil in the template image, where the similarity calculated by template matching is highest, is set as a pupil vicinity point. In this embodiment, pupil extraction is executed by using the method used in the first embodiment. Any other method capable of extracting a pupil range except flesh color and white-of-eye regions can be used.

The poor pupil hue quality correction unit 674 executes poor pupil hue quality determination for each pupil portion extracted by the pupil extraction unit 673. For a pupil with a poor pupil hue quality, if the face size calculated by the face size calculation unit 671 is larger than a predetermined value, correction data to correct the poor pupil hue quality at a high resolution is generated. If the face size is smaller than the predetermined value, correction data to correct the poor pupil hue quality at a low resolution is generated. The reason for this is as follows. When the face size is large, and for example, when the face region has a high resolution of 300×300 pixels or more, application of poor pupil hue quality correction for a low-resolution face in which pixel values in the poor pupil hue quality region are simply changed generates a sense of incompatibility after correction. To execute accurate correction without any sense of incompatibility, correction data for a high resolution is prepared.

In poor pupil hue quality determination, in this embodiment, parameters such as an average hue and average brightness of each pupil portion extracted by the pupil extraction unit 673 are extracted. When the average hue or average brightness falls outside a predetermined range of that without any red-eye or gold-eye, it is determined that a poor pupil hue quality is generated. The poor pupil hue quality determination method is not limited to this, and a method using a hue range or the like may be used.

For a pupil portion determined to have a poor pupil hue quality, the poor pupil hue quality region is extracted, and a red-eye region and high brightness region are extracted from the poor pupil hue quality region. The processing from the specific hue pixel extraction (step S3037) to the poor pupil hue quality region determination (step S3039) in the poor pupil hue quality region extraction (step S303), the high brightness region extraction (step S304), and the red-eye region determination (step S305) of the first embodiment are executed for the extracted pupil portion.

For the extracted red-eye region and high brightness region, red-eye region correction data and high brightness region correction data for a high or low resolution are generated in accordance with the face size calculated by the face size calculation unit 671.

When the face size is smaller than a predetermined size, i.e., in red-eye region correction data for a low resolution, the brightness or chroma of each pixel in the red-eye region is corrected by using the same method as in the red-eye correction processing (step S306) of the first embodiment, thereby generating red-eye region correction data.

When the face size is larger than the predetermined size, i.e., in red-eye region correction data for a high resolution, a sense of incompatibility is generated in an enlarged image when only the brightness or chroma is simply corrected. Hence, red-eye region correction data is generated by a method different from the above-described red-eye region correction data generation for a low resolution.

In this embodiment, an iris template prepared in advance is used. Parameters such as a size, hue, and brightness extracted by a predetermined method are applied to the template to generate a template for correction data. This is used as red-eye region correction data. For the size parameter extracted in creating the correction data template, the area of the pupil portion extracted by the pupil extraction unit 673 is extracted, and the area of the correction data template is set to almost equal the area. For the hue or brightness parameter, the average hue or brightness of pixels in a region except the poor pupil hue quality region and, more particularly, in a region near the outer periphery of the pupil is extracted, and each pixel of the correction data template is set close to the parameter.

In this embodiment, red-eye region correction data is generated by using the iris template. Any other method capable of generating correction data without any sense of incompatibility in an enlarged image can be used.

In high brightness region correction data generation, the same method as in the high brightness region area calculation (step S307) and area determination branch (step S308) of the first embodiment is applied to calculate the areas of all the extracted high brightness regions. It is determined for each high brightness region on the basis of its area whether the high brightness region is a catch light region or gold-eye region. On the basis of the determination result, high brightness region correction data is generated by using different methods.

For a high brightness region whose area has a predetermined value or more, i.e., a high brightness region determined as a gold-eye region, the catch light region in the high brightness region is determined by using the same methods, i.e., the intra-high-brightness-region maximum brightness pixel detection (step S309) and catch light region determination (S310), as in the first embodiment. Then, a region excluding the catch light region from the high brightness region is determined as a gold-eye region.

In generating high brightness region correction data in the gold-eye region, correction data for a low or high resolution is generated in accordance with the face size by using the same method as in the above-described red-eye region correction data generation.

In generating correction data by using an iris template for a high resolution, correction data is preferably generated such that the iris pattern matches that of the red-eye region correction data. In generating high brightness region correction data for a low resolution in the catch light region, only the chroma of each pixel in the region is reduced by using the same method as in the catch light correction processing (step S313) of the first embodiment to generate high brightness region correction data.

In generating correction data for a high resolution, the light source color in the image sensing environment is estimated from pixels in a region outside the pupil portion extracted by the pupil extraction unit 673, in which the chroma has a predetermined value or less, and the brightness has a predetermined value or more, i.e., the white-of-eye region to prevent any sense of incompatibility from being generated in an enlarged image. The average hue and average brightness of the pixels in the white-of-eye region are extracted and determined as a correction color.

High brightness region correction data in the catch light region is generated by using the determined correction color. The high brightness region correction data in the gold-eye region and that in the catch light region are integrated to generate high brightness region correction data in the high brightness region. In integration to generate correction data for a low resolution, the correction data of the respective regions are simply added. In generating correction data for a high resolution, data obtained by blurring the boundary portion between the catch light region and the gold-eye region by scaling corresponding to the area of the catch light region and, for example, data obtained by blurring the boundary portion by using a low-pass filter with a kernel size proportional to the square root of the area of the catch light region is used as high brightness region correction data to avoid any sense of incompatibility.

When it is determined that the area of the high brightness region has a predetermined value or less, i.e., no gold-eye region is generated, the region is determined as a catch light region, and high brightness region correction data is generated in that region. For this correction data, the same method as in the above-described correction data generation in the catch light region is used. Correction data for a high resolution and that for a low resolution are generated and used as high brightness region correction data in the high brightness region.

The image correction processing unit 67 generates red-eye region correction data and high brightness region correction data by using the above-described method. The corrected image recording unit 68 corrects the poor pupil hue quality by using the correction data and the image data recorded in the image recording unit 63 and records the corrected image in the memory. In this correction, the correction data of the image data recorded in the image recording unit 63 may simply be replaced with the correction data generated by the image correction processing unit 67 in corresponding regions. However, to eliminate the sense of incompatibility in correction, for the replaced correction data, the boundary portions between the red-eye region correction data, the original image data, and the high brightness region correction data are preferably blurred by scaling corresponding to the area of the red-eye region or high brightness region. With this correction processing, when a poor pupil hue quality is generated in flash photography, the poor pupil hue quality can automatically be corrected to a natural pupil, and the corrected image can be recorded.

As the second embodiment, an image sensing apparatus which causes the image processing apparatus of the first embodiment to automatically correct a poor pupil hue quality of a person in a sensed image and records the image has been described.

Third Embodiment

Figure 8:
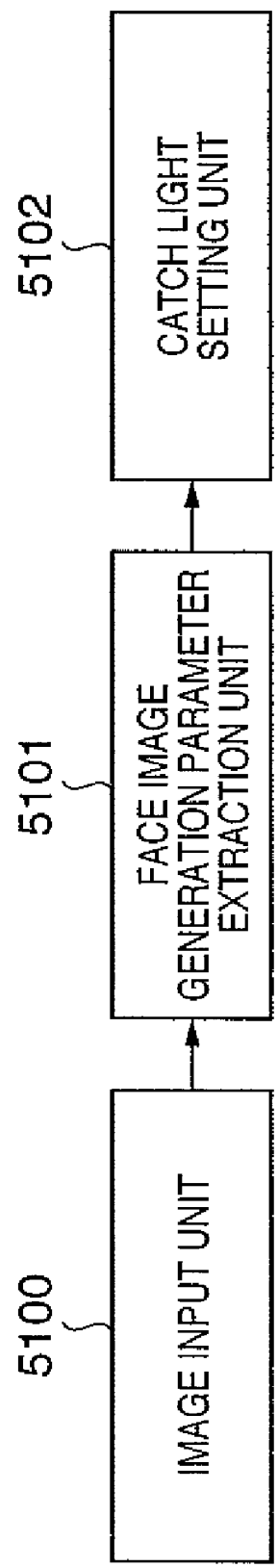
FIG. 8 is a block diagram showing the functional arrangement of an image processing apparatus according to the third embodiment.

FIG. 8 is a block diagram showing the functional arrangement of an image processing apparatus according to this embodiment.

The image processing apparatus of the present invention includes an image input unit 5100, face image generation parameter extraction unit 5101, and catch light setting unit 5102.

Face image generation parameters extracted by the face image generation parameter extraction unit 5101 include, e.g., angle (e.g., face direction) information parameters, position information parameters (e.g., the positions of a pupil and iris in an eye region), and color information parameters (e.g., the color component values of parts of the face) necessary for describing a face image contained in an input image. However, the face image generation parameters are not limited to the angle information parameters, position information parameters, and color information parameters.

Figure 9:
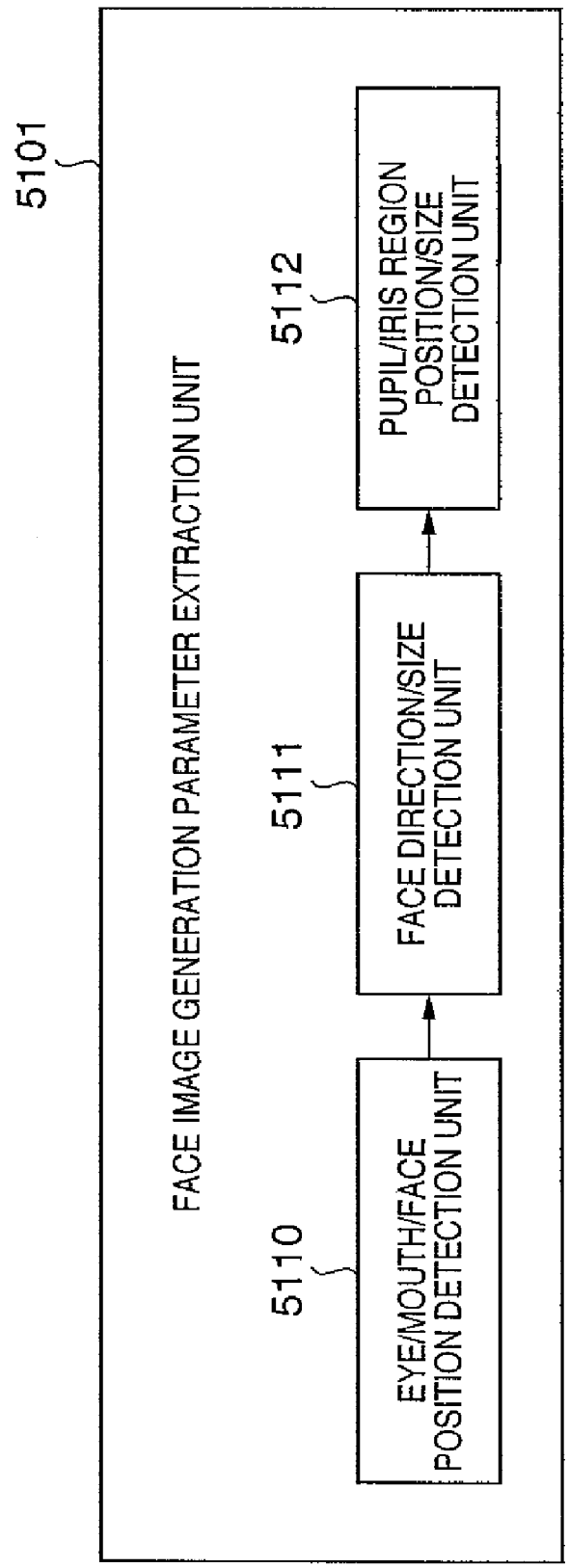
FIG. 9 is a block diagram showing the detailed arrangement of a face image generation parameter extraction unit.
Figure 10:
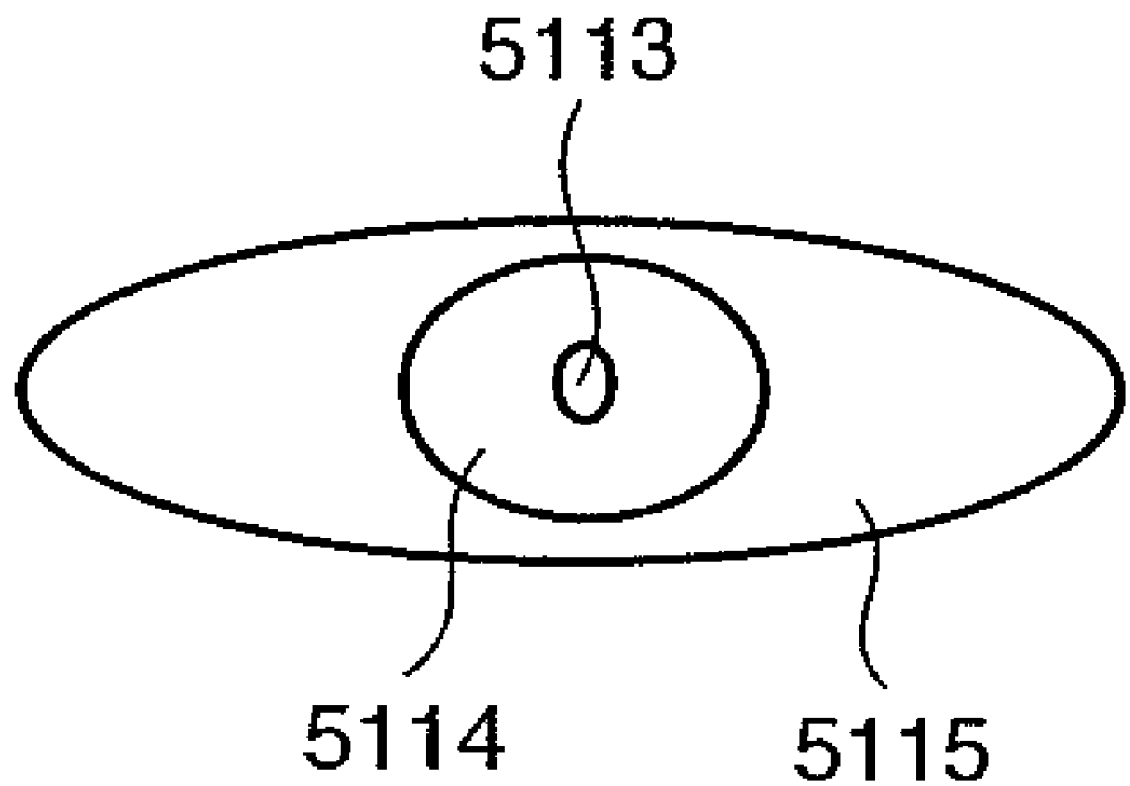
FIG. 10 is a view showing white, iris, and pupil regions in an eye region.

The image input unit 5100 receives, as an input image, a digital image obtained by A/D-converting a signal from the CCD sensor of a digital camera. FIG. 9 is a block diagram showing the detailed arrangement of the face image generation parameter extraction unit. As shown in FIG. 9, the face image generation parameter extraction unit 5101 includes an eye/mouth/face position detection unit 5110, face direction/size detection unit 5111, and pupil/iris region position/size detection unit 5112. FIG. 10 is a view showing the structure of a human eye region. The eye region includes a pupil 5113, iris 5114, and white 5115 of the eye.

Figure 11:
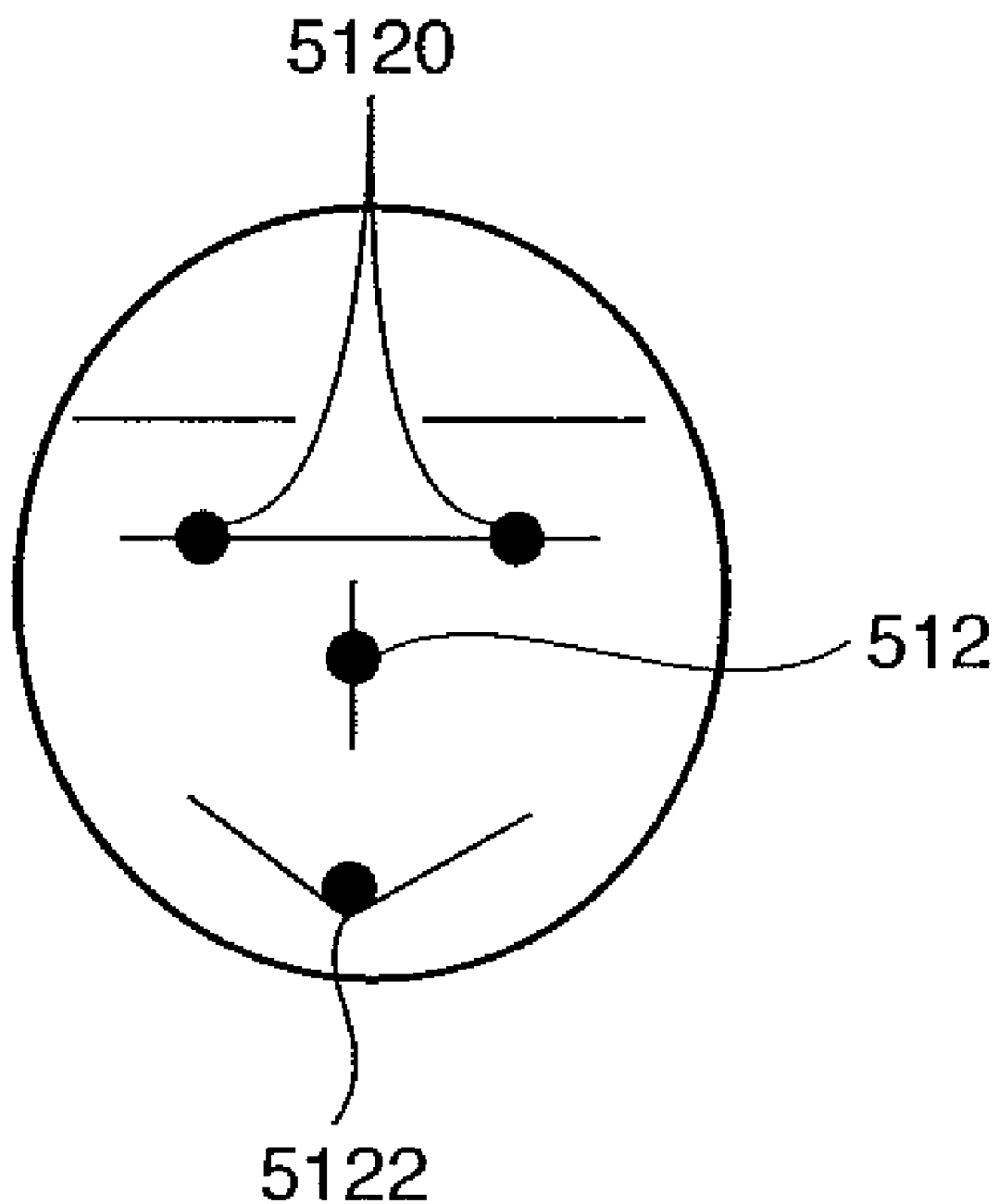
FIG. 11 is a view showing the detection positions of a face, eyes, and mouth detected by using a convolutional neural network.

The eye/mouth/face position detection unit 5110 detects the positions of eyes, mouth, and face in the image obtained by the image input unit 5100. The face, eye, and mouth candidate positions are detected by using, e.g., a convolutional neural network (Yann LeCun and Yoshua Bengio, "Convolutional Networks for Images Speech, and Time Series", The Handbook of Brain Theory and Neural Networks, pp. 255-258, 1995). The face, eye, and mouth detection positions are determined from the spatial layout relationship between the detected face, eye, and mouth candidate positions. FIG. 11 is a view showing a face detection position 5121, eye detection positions 5120, and mouth detection position 5122 detected by using the convolutional neural network.

Figure 12:
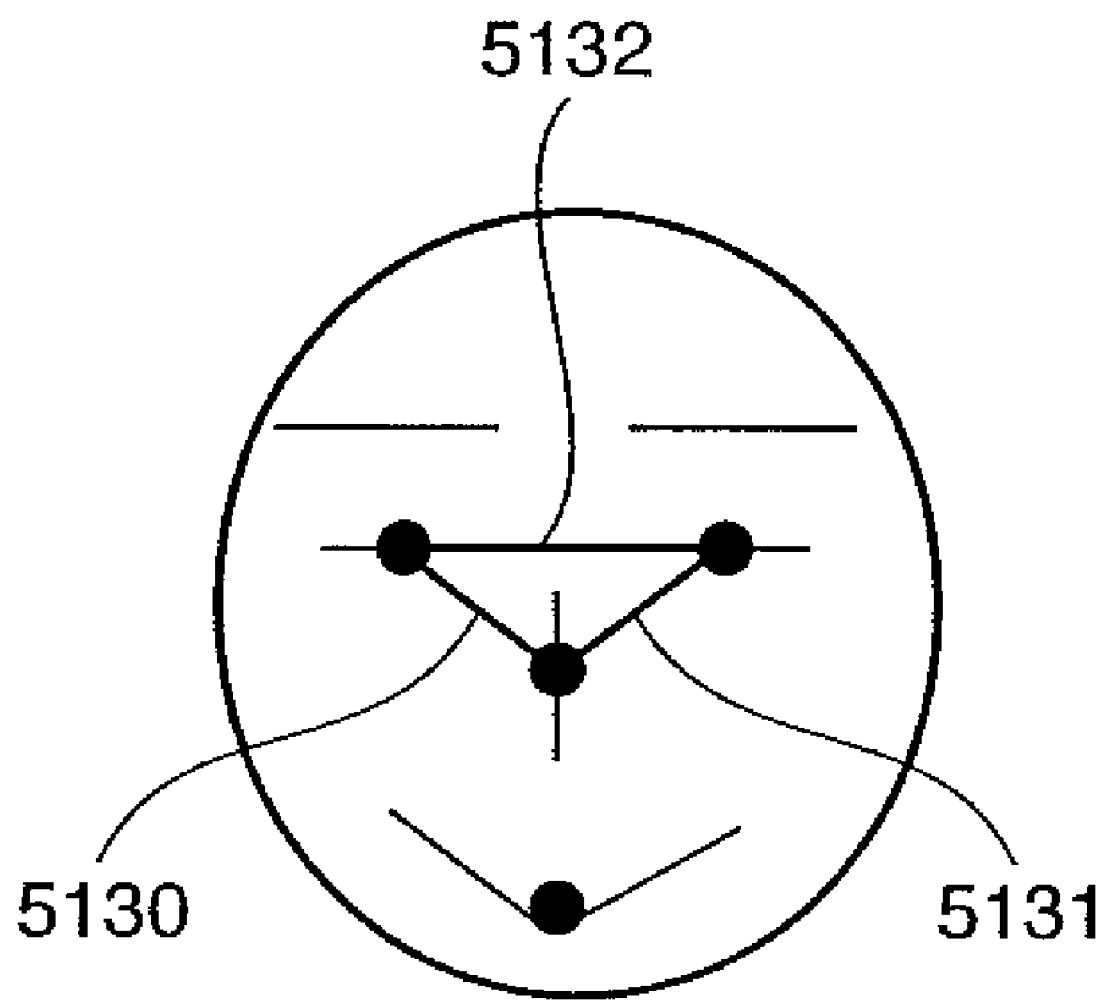
FIG. 12 is a view showing the distances between the detection positions of the left eye, right eye, and mouth when the face is directed to the front.
Figure 13:
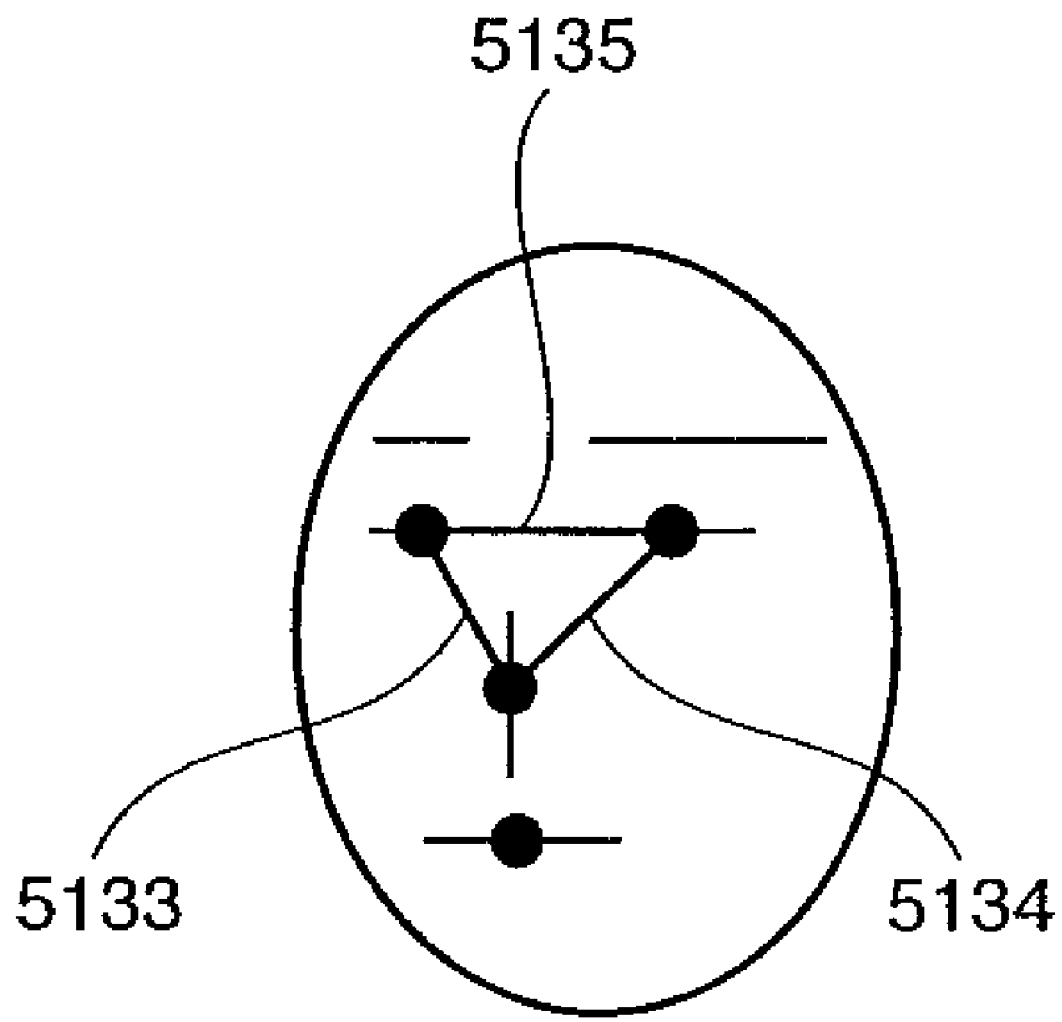
FIG. 13 is a view showing the distances between the detection positions of the left eye, right eye, and mouth when the face is rotated to the left.

FIG. 12 is a view showing the distances between the detection positions of the left eye, right eye, and mouth when the face is directed to the front. FIG. 13 is a view showing the distances between the detection positions of the left eye, right eye, and mouth when the face is rotated to the left. The face direction detection unit 5111 detects the face direction in accordance with the ratio of a distance (5130) between the right eye detection position and the face detection position and a distance (5131) between the left eye detection position and the face detection position on the basis of the eyes (5120), mouth (5122), and face (5121) obtained by the eye/mouth/face position detection unit 5110.

More specifically, when the face is directed to the front, as shown in FIG. 12, the ratio of the distance (5130) between the right eye detection position and the face detection position and the distance (5131) between the left eye detection position and the face detection position is 1:1. When the face is rotated to the right, as shown in FIG. 13, a distance (5133) between the right eye detection position and the face detection position is shorter than the distance (5130) between the right eye detection position and the face detection position when the face is directed to the front. A distance (5134) between the left eye detection position and the face detection position is longer than the distance (5131) between the left eye detection position and the face detection position when the face is directed to the front. The face direction is estimated by using the distances between the eye detection positions and the face detection position.

Figure 14:
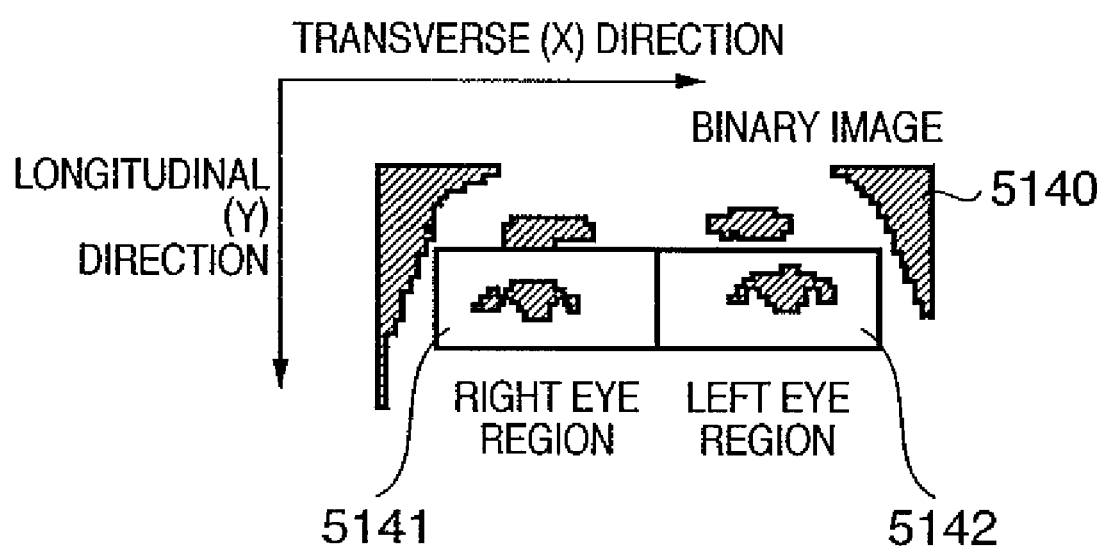
FIG. 14 is a view showing a binary image near the eye region after binarization.

The angle when the face is directed to the front to defined as 0°. A rotation angle α when the face is axially rotated to the left is given by $$\alpha = \sin^{-1}\left(\frac{4b^2 + c^2 - 4a^2}{2ab}\right)$$

a: the distance between the left eye detection position and the face detection position, b: the distance between the face detection position and the median between the left and right eye detection positions, c: the distance between the left and right eye detection positions A rotation angle β when the face is axially rotated to the upper side is given by $$\beta = \sin^{-1}\left(\frac{4e^2 + f^2 - fd^2}{2de}\right)$$

d: the distance between the face detection position and the mouth detection position, e: the distance between the face detection position and the median between the eye detection position and the mouth detection position, f: the distance between the mouth detection position and the median between the eye detection position and the mouth detection position The pupil/iris region position/size detection unit 5112 is a module to calculate the position and size of an iris region including a pupil region in an eye region. In this embodiment, the iris region including the pupil region will be referred to as a pupil/iris region. To calculate the position and size of the pupil/iris region, for example, binary threshold processing (the threshold value is set to, e.g., 50 but not limited to this value) is executed for the image obtained by the image input unit 5100 to calculate a binarized image 5140, as shown in FIG. 14. A rectangular right eye region 5141 and left eye region 5142 which surround only the right and left eye regions are determined by using the eye and face detection positions obtained by the eye/mouth/face position detection unit 5110, as shown in FIG. 14.

Figure 15:
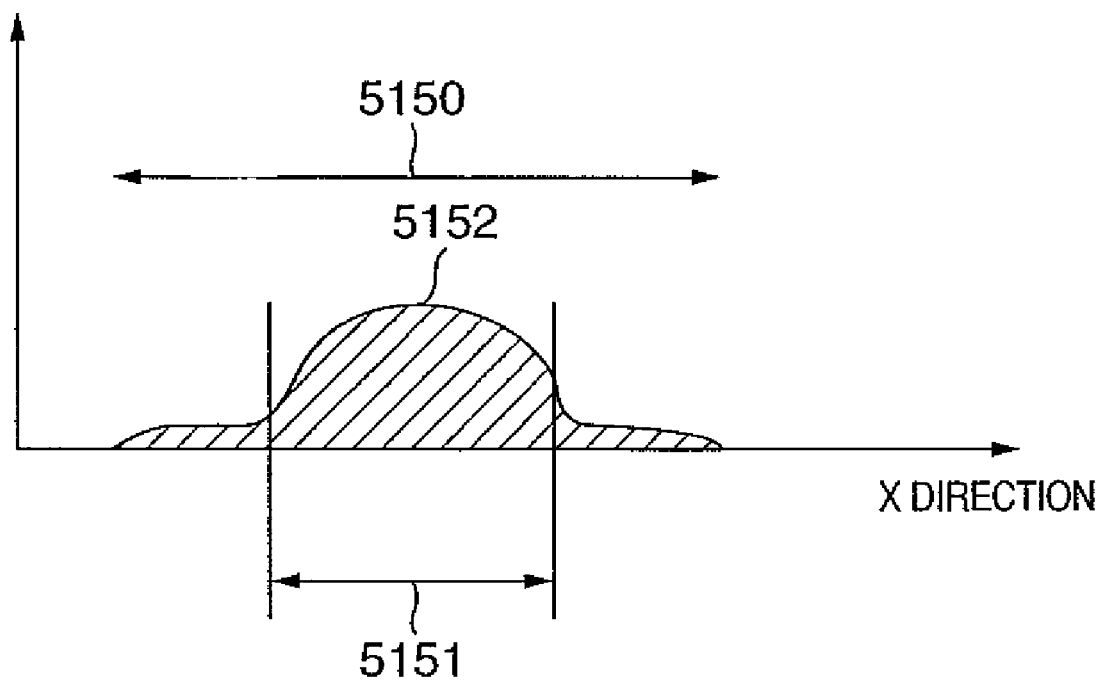
FIG. 15 is a graph showing the horizontal histogram in the eye region.
Figure 16:
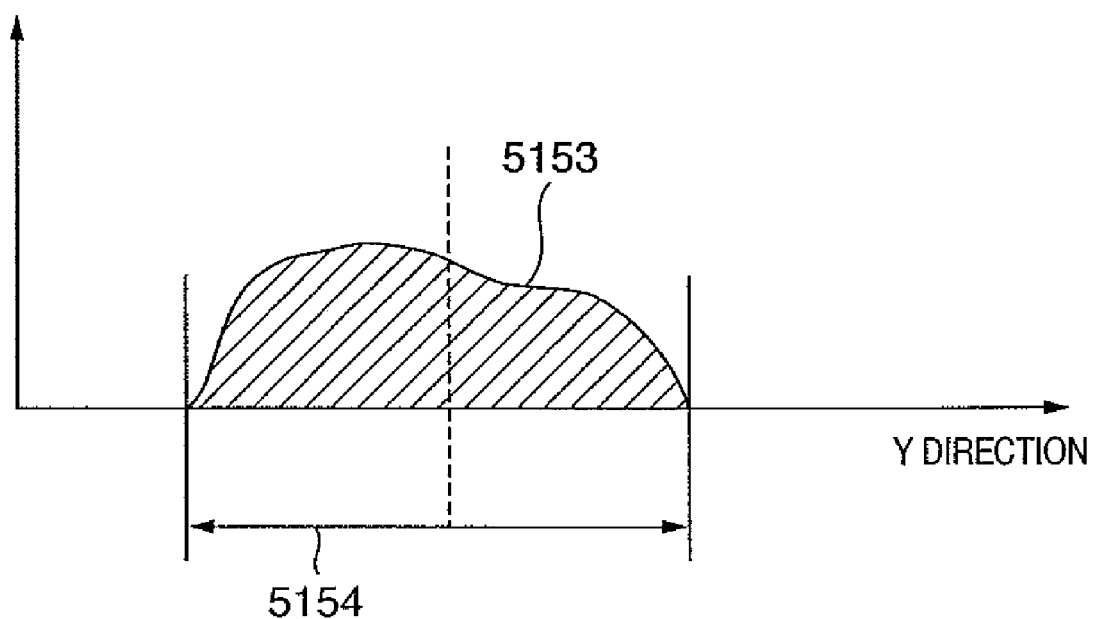
FIG. 16 is a graph showing the vertical histogram in the eye region.

For each eye region, vertical and horizontal histograms are created, as shown in FIGS. 15 and 16. A horizontal (X-direction) length 5150 of the eye, a pupil/iris region 5151, and a horizontal central position 5152 of the pupil/iris region based on the X-coordinate representing the maximum value of the histogram are obtained from the created horizontal histogram shown in FIG. 15. In addition, a pupil/iris region central position 5153 and a vertical (Y-direction) length 5154 of the eye are obtained from the vertical histogram shown in FIG. 16.

Figure 18:
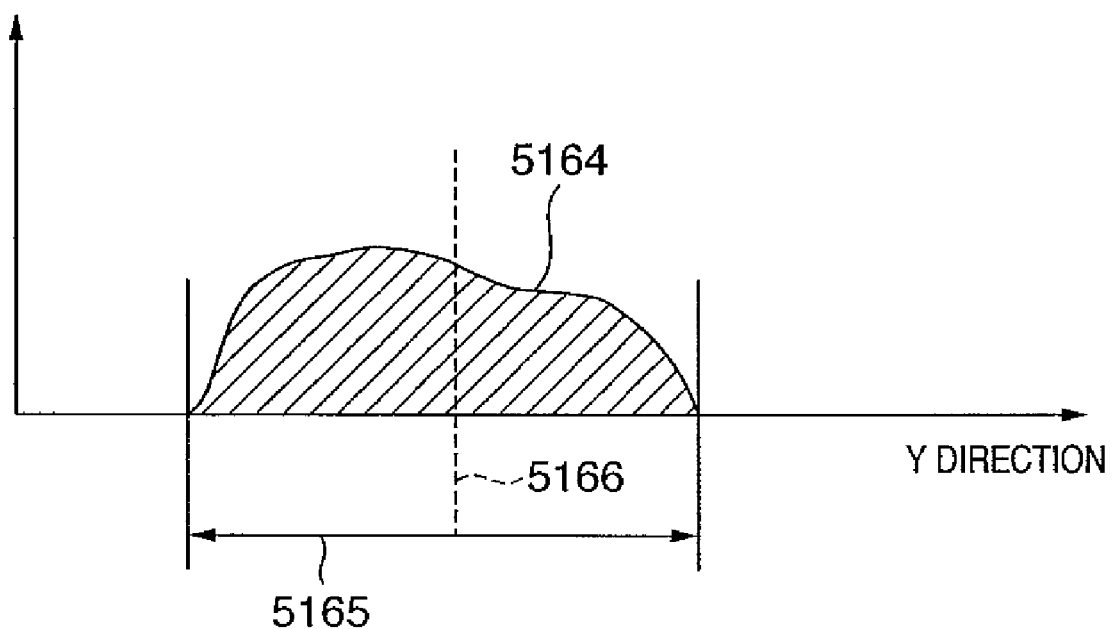
FIG. 18 is a graph showing the vertical histogram in the eye region when the face is directed to the front.

FIGS. 17 and 18 respectively show the horizontal and vertical histograms in the eye region when the pupil/iris region is present at the center of the eye region, i.e., when the face is directed to the front. Vertical and horizontal central positions 5162 and 5164 of the pupil/iris region are located almost at the same positions as the medians of an extracted horizontal (X-direction) length 5160 of the eye and a vertical (Y-direction) length 5165 of the eye.

Figure 19:
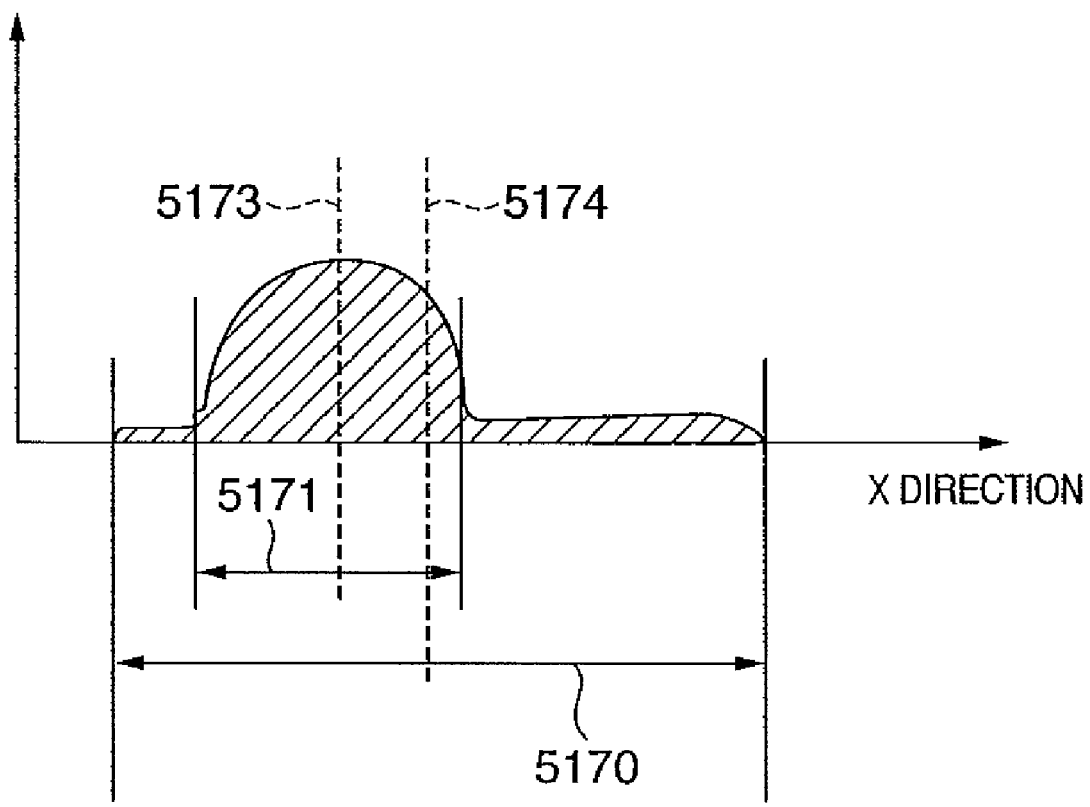
FIG. 19 is a graph showing the horizontal histogram in the eye region when the pupil/iris region is moved in the horizontal direction.
Figure 20:
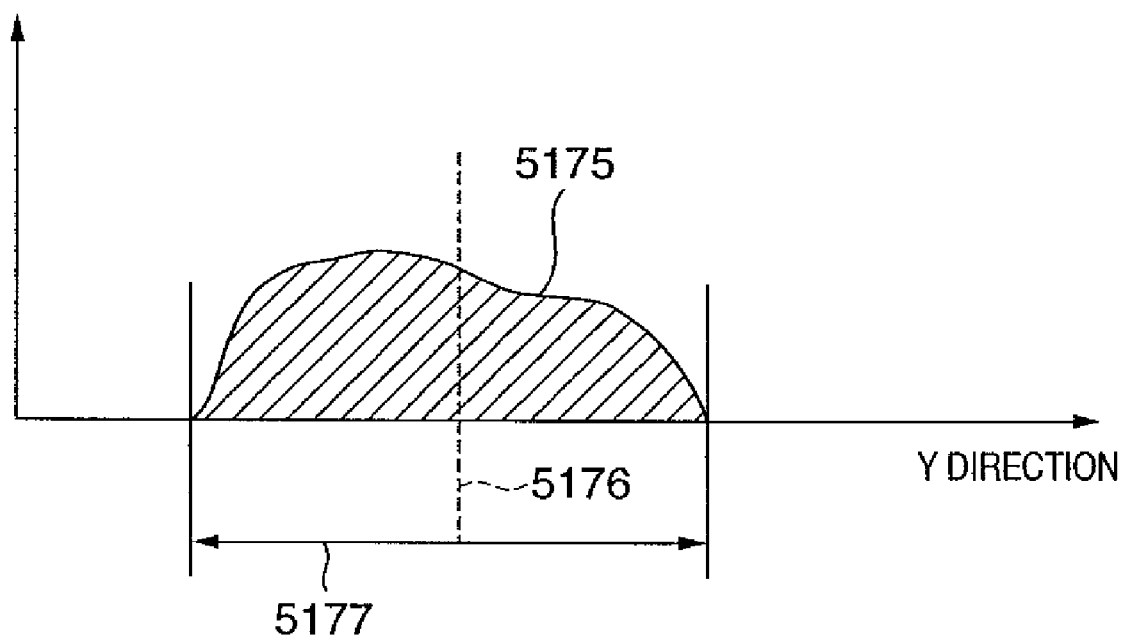
FIG. 20 is a graph showing the vertical histogram in the eye region when the pupil/iris region is moved in the horizontal direction.

FIGS. 19 and 20 respectively show the horizontal and vertical histograms when the pupil/iris region is moved from the center of the eye region in the horizontal direction (X direction). A horizontal central position 5173 of the pupil/iris region is different from a central position 5174 of the extracted horizontal (X-direction) length of the eye.

Figure 21:
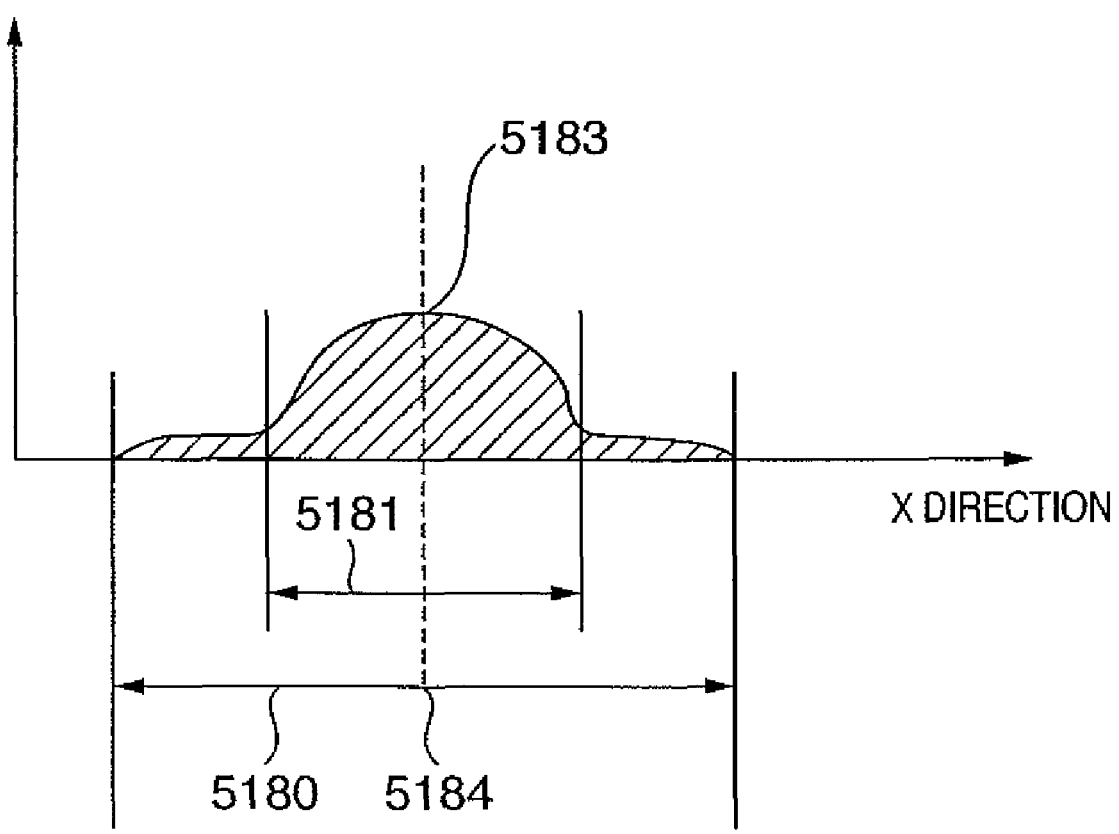
FIG. 21 is a graph showing the horizontal histogram in the eye region when the pupil/iris region is moved upward.
Figure 22:
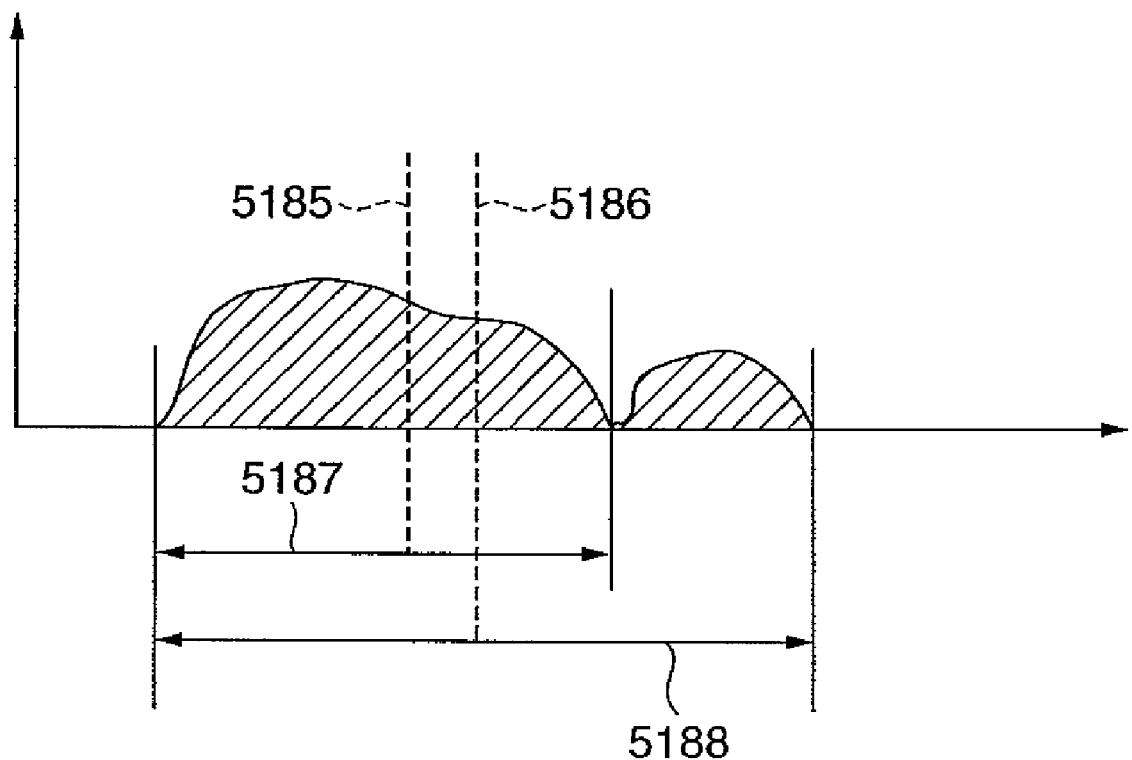
FIG. 22 is a graph showing the vertical histogram in the eye region when the pupil/iris region is moved upward.

FIGS. 21 and 22 respectively show the horizontal and vertical histograms when the pupil/iris region is moved from the center of the eye region in the vertical direction (Y direction). A vertical central position 5185 of the pupil/iris region is different from a central position 5186 of the extracted vertical (Y-direction) length of the eye. When a plurality of peaks are generated in a histogram, the central position 5185 of the pupil/iris region and a pupil/iris region 5187 are obtained by using a histogram with the highest peak.

As is apparent from these histograms shown in FIGS. 15 to 22, when the histograms of the binary image in the eye region is used, the central position of the pupil/iris region in the eye region can be extracted. The histograms shown in FIGS. 17 and 18 are the same as in FIGS. 15 and 16.

Figure 23:
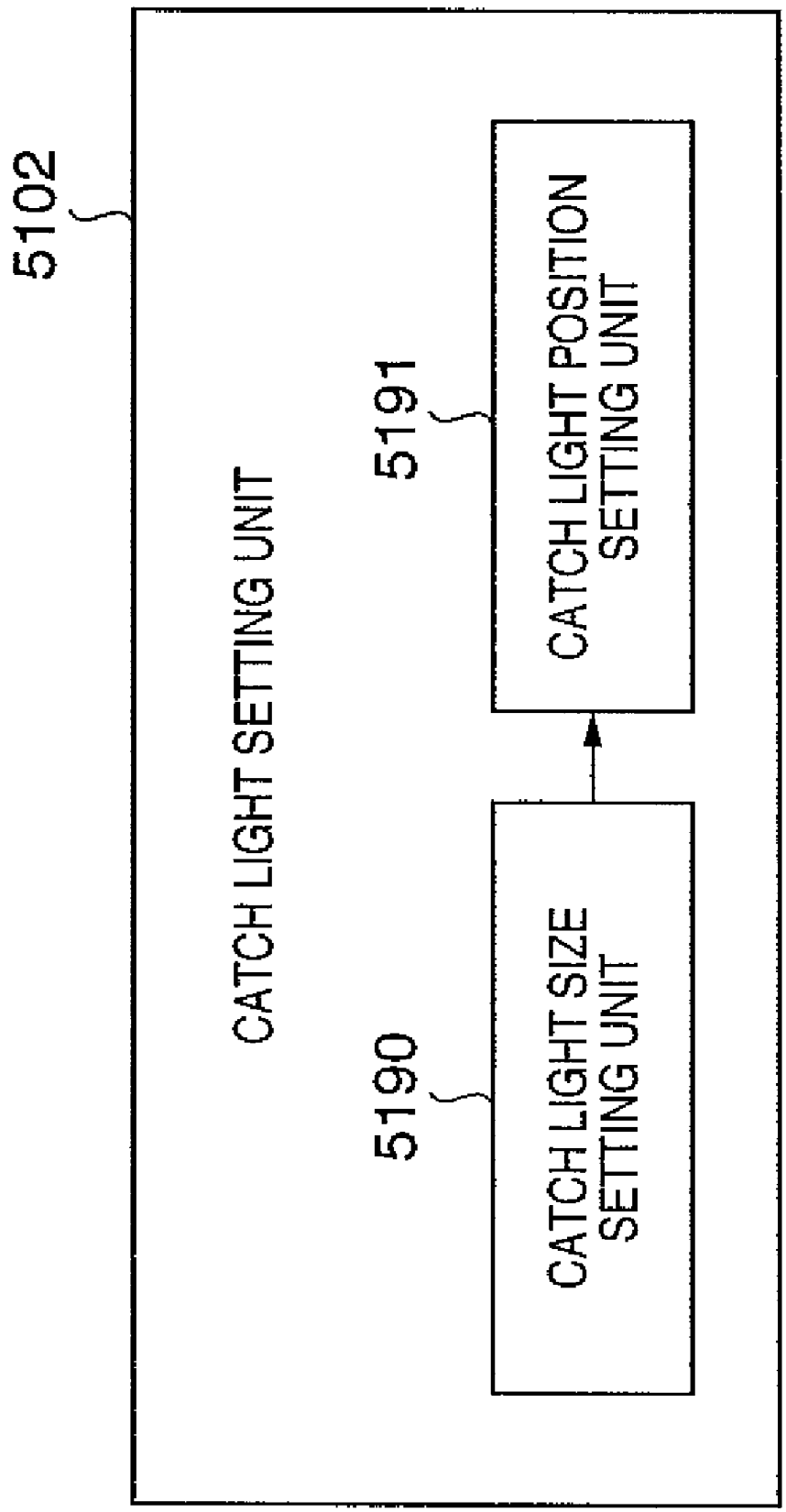
FIG. 23 is a block diagram showing the detailed arrangement of a catch light setting unit.

FIG. 23 is a block diagram showing the detailed arrangement of the catch light setting unit. The catch light setting unit 5102 includes a catch light size setting unit 5190 and catch light position setting unit 5191, as shown in FIG. 23.

The catch light size setting unit 5190 determines the catch light size on the basis of the pupil/iris region size obtained by the pupil/iris region position/size detection unit 5112. In this embodiment, the shape of catch light is set to circular. However, the shape of catch light is not limited to circular.

FIG. 24 is a graph showing the relationship between the horizontal histogram in the eye region and the catch light size in determining the catch light size. The diameter of circular catch light is set to ⅕ a pupil/iris region size 5200. The diameter of the circle catch light is not limited to ⅕ the pupil length, either. Additionally, in place of the pupil size, for example, the face size may be used as a feature serving as a reference to determine the catch light diameter.

The catch light position setting unit 5191 sets the catch light position in the pupil/iris region. In this embodiment, the catch light position is set on the basis of the center of the pupil/iris region. However, catch light need not always be set on the basis of the center of the pupil/iris region.

Figure 25:
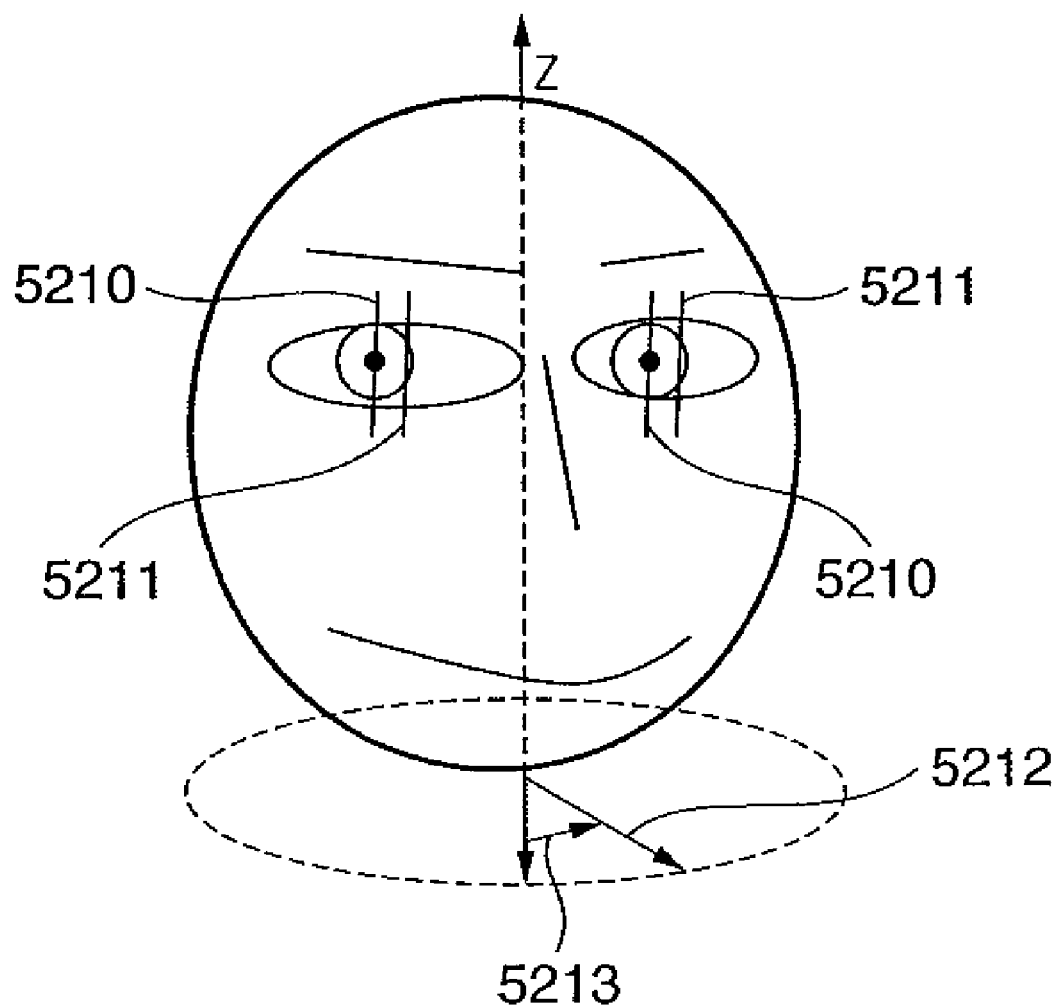
FIG. 25 is a view showing a case in which the face is rotated to the left in the horizontal plane (rotation about the Z-axis), and the line of sight is directed to the front.

FIG. 25 is a view showing a case in which the face is rotated to the left in the horizontal plane (rotation about the Z-axis), and the line of sight is directed to the front. The position of catch light in the pupil/iris region based on its center is determined by a face direction 5212 and the distances between eye region centers 5211 and pupil/iris region centers 5210 (direction of line of sight), as shown in FIG. 25.

Assuming that the face is directed to the front, and catch light is present at the center of the pupil/iris region. Let L1x be the transverse (X-direction) position vector and L1y be the longitudinal (Y-direction) position vector along which catch light moves in the eye region upon rotating the face.

$$g*L1x=-\sin(\alpha)$$

left vector: +, right vector: −

$$g*L1y=-\sin(\beta)$$

upper vector: +, lower vector: −

α: rotation angle in the horizontal plane (rotation about the Z-axis in FIG. 25)

β: rotation angle in the vertical plane (the plane including the Z-axis in FIG. 25)

g: constant value determined by the face size

Figure 26:
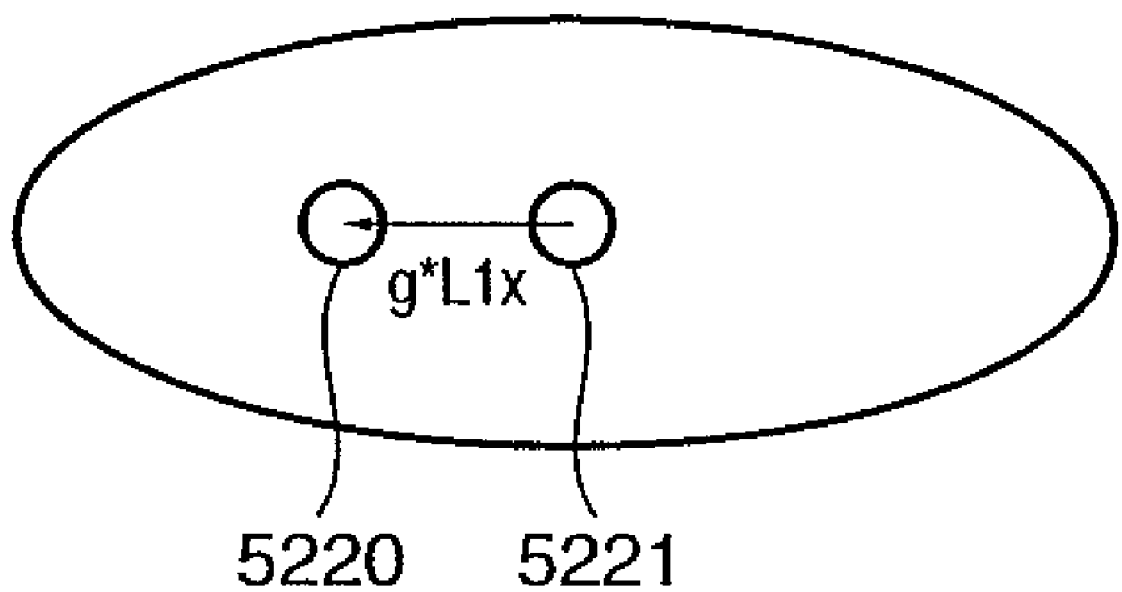
FIG. 26 is a view showing a catch light position vector when the face direction is rotated from the front to the left in the horizontal plane.

FIG. 26 is a view showing a catch light position vector when the face direction is rotated to the left in the horizontal plane on the basis of the catch light position when the face is directed to the front. The transverse (X-direction) position vector when the face is rotated from the front to the left is represented by L1x.

In addition, let L2x (leftward from the center of the eye region: +, rightward from the center of the eye region: −) be the transverse (X-direction) position vector and L2y (downward from the center of the eye region: −, upward from the center of the eye region: +) be the longitudinal (Y-direction) position vector of the center of the eye region and the center of the pupil/iris region based on the center of the eye region. Catch light movement distances Lx and Ly from the center of the pupil/iris region are calculated by Lx=(g*L1x−h*L2x) and Ly=(g*L1y−h*L2y), where g and h are constant values determined by the face size.

Hence, when the face is directed to the left in the horizontal plane (rotation about the Z-axis in FIG. 25), and the direction of line of sight is directed to the front, as shown in FIG. 25, L1x (vector size: −) is calculated from the face direction, and L2x (vector size: +) is calculated from the direction of line of sight. Hence, when $$g*L_{x1} \cong h*l_{x2}$$

$$L_x=(g*L_{x1}-h*L_{x2}) \cong 0$$

so that catch light is set almost at the central position of the pupil/iris region. The catch light position determined by the pupil position or face direction may be determined by only the face direction or pupil position or by using any other means.

Figure 27:
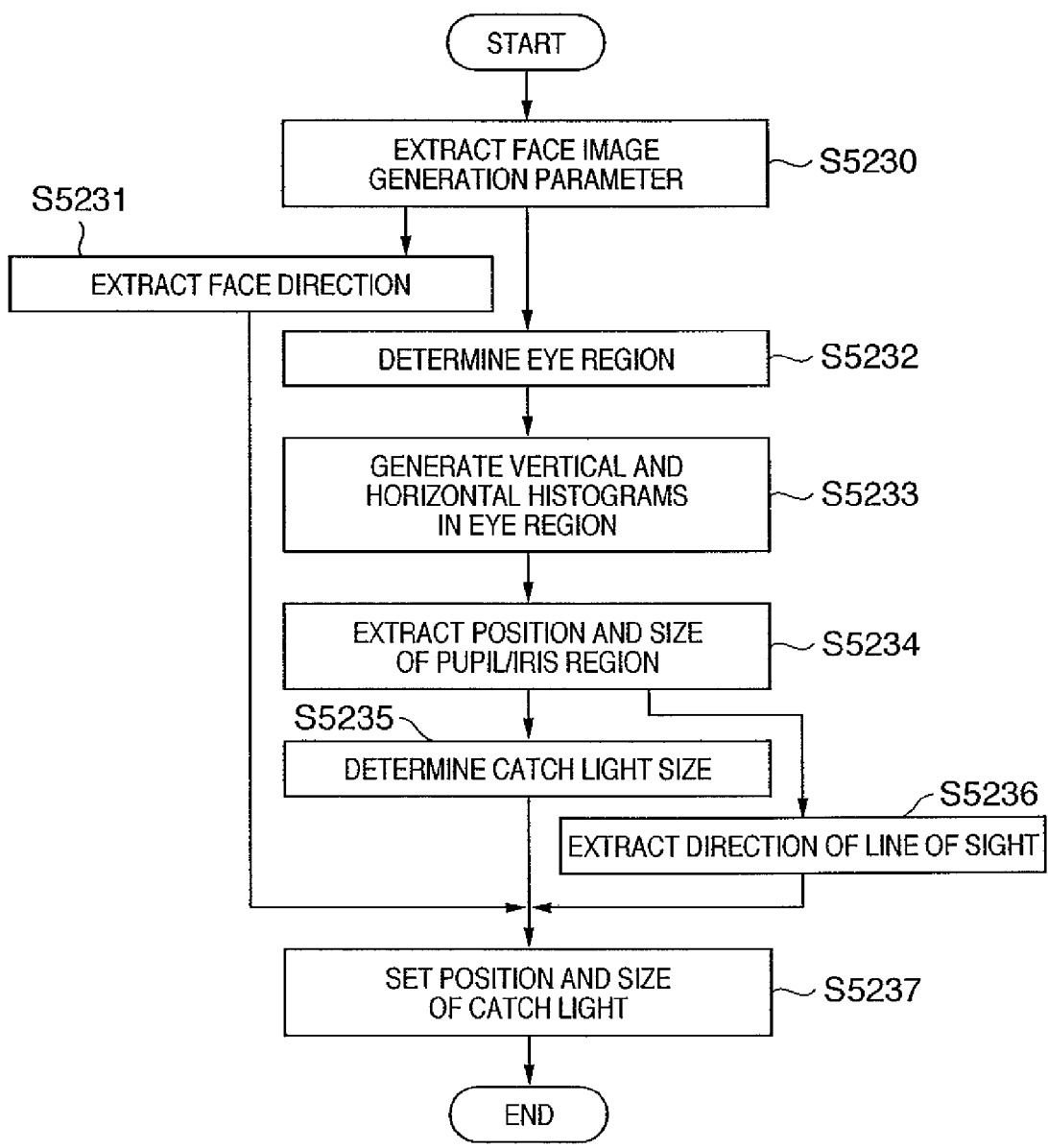
FIG. 27 is a flowchart showing the overall processing procedures according to the third embodiment.

FIG. 27 is a flowchart showing the overall processing procedures according to the third embodiment. FIG. 27 shows procedures from face image generation parameter extraction to catch light position setting.

In step S5230, face image generation parameters are extracted. The face direction is extracted by using the face image generation parameters (step S5231). In step S5232, an eye region is determined by using the face image generation parameters. In step S5233, vertical and horizontal histograms in the eye region are generated. In step S5234, the position and size of the pupil/iris region are extracted by using the vertical and horizontal histograms. In step S5235, the catch light size is determined. In step S5236, the direction of line of sight is extracted. In step S5237, the position and size of catch light are set by using the face direction extracted in step S5231, the direction of line of sight extracted in step S5236, and the catch light size extracted in step S5235.

Fourth Embodiment

Figure 28:
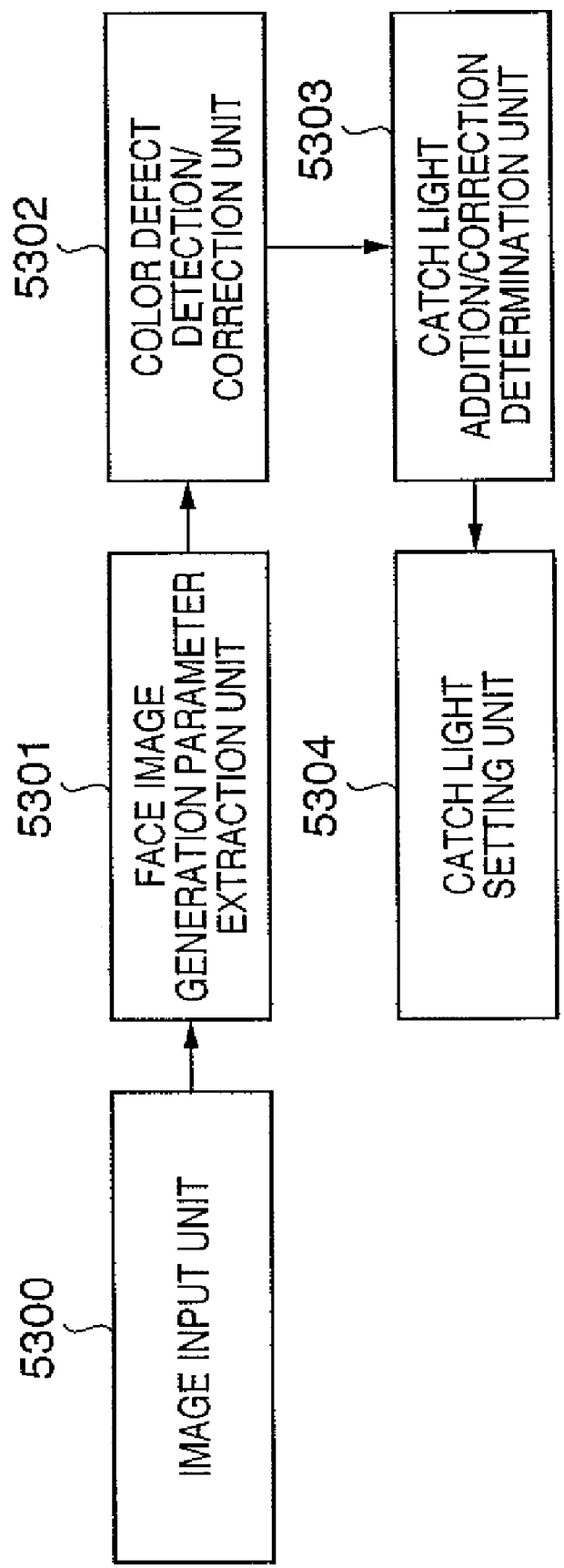
FIG. 28 is a block diagram showing the functional arrangement of an image processing apparatus according to the fourth embodiment.

FIG. 28 is a block diagram showing the functional arrangement of an image processing apparatus according to the fourth embodiment. The image processing apparatus includes an image input unit 5300, face image generation parameter extraction unit 5301, color defect detection/correction unit 5302, catch light addition/correction determination unit 5303, and catch light setting unit 5304.

The image input unit 5300 and face image generation parameter extraction unit 5301 of the fourth embodiment execute the same operations as in the third embodiment.

The color defect detection/correction unit 5302 detects and corrects a color defect in the image. For example, a red-eye generated in flashlight emission is detected and corrected. In the fourth embodiment, the color defect detection/correction processing is red-eye region detection/correction. However, the processing is not limited to red-eye region detection/correction. To detect a red-eye, for example, an eye region is determined by using an eye position detection parameter extracted by the face image generation parameter extraction unit 5301, and a red-eye is detected from the eye region by using color information parameter extracted by the face image generation parameter extraction unit 5301.

If a region having a red color component with a predetermined value or more is detected, it is determined that a red-eye is generated. In red-eye correction processing, the red-eye region is corrected by using, e.g., an iris region color prepared in advance.

The catch light addition/correction determination unit 5303 determines the presence/absence of catch light in the image after color correction by using face image generation parameters obtained by analyzing the image obtained by the image input unit 5300. the presence/absence of catch light is determined depending on, e.g., whether a brightness value equal to or larger than a predetermined value (e.g., a brightness value of 200) is present in the eye region.

After color defect correction processing, the catch light setting unit 5304 sets catch light by using the method described in the third embodiment. As described in the third embodiment, the catch light setting method is not limited to that described in the third embodiment.

Figure 29:
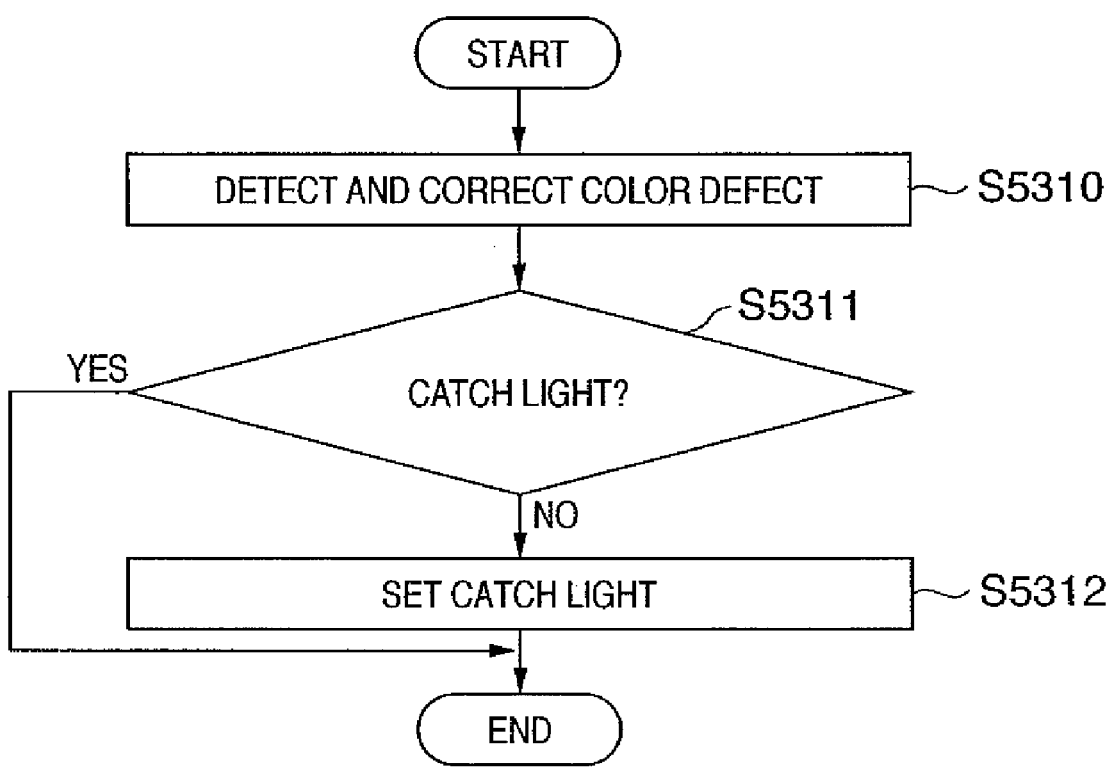
FIG. 29 is a flowchart showing processing procedures of executing catch light setting after color defect detection/correction processing.

FIG. 29 is a flowchart showing processing procedures of executing catch light setting after color defect detection/correction processing. After a color defect detection/correction processing S5310, if it is determined in step S5311 that no catch light is present, catch light is set in step S5312. If it is determined in step S5311 that catch light is present, no processing is executed.

Fifth Embodiment

Figure 30:
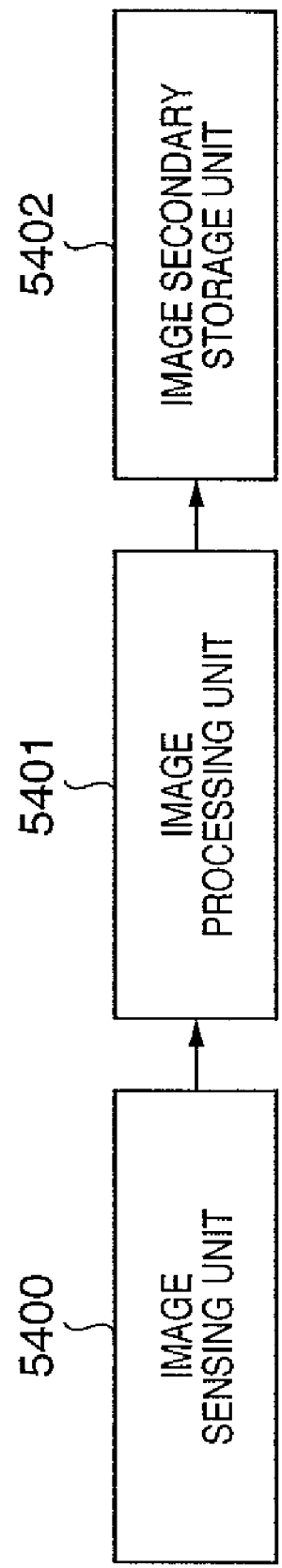
FIG. 30 is a block diagram showing the functional arrangement of an image sensing apparatus according to the fifth embodiment.
Figure 31:
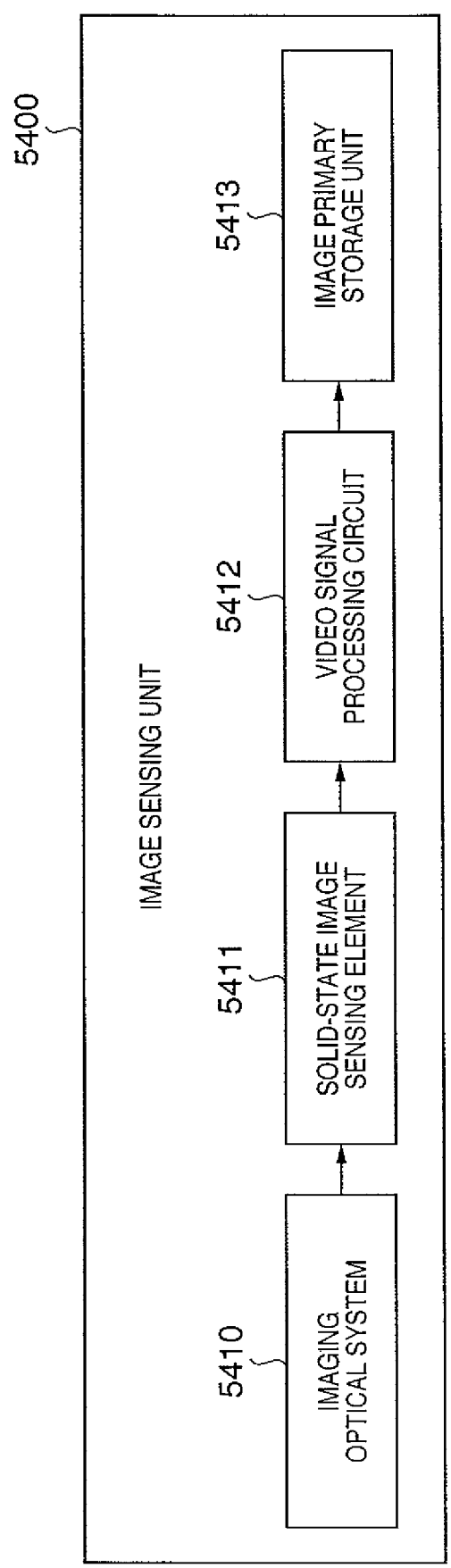
FIG. 31 is a block diagram showing the detailed arrangement of an image sensing unit.

FIG. 30 is a block diagram showing the functional arrangement of an image sensing apparatus according to the fifth embodiment. The image sensing apparatus includes an image sensing unit 5400, image processing unit 5401, and image secondary storage unit 5402. FIG. 31 is a block diagram showing the detailed arrangement of the image sensing unit 5400. As shown in FIG. 31, the image sensing unit 5400 includes an imaging optical system 5410, solid-state image sensing element 5411, video signal processing circuit 5412, and image primary storage unit 5413.

Figure 32:
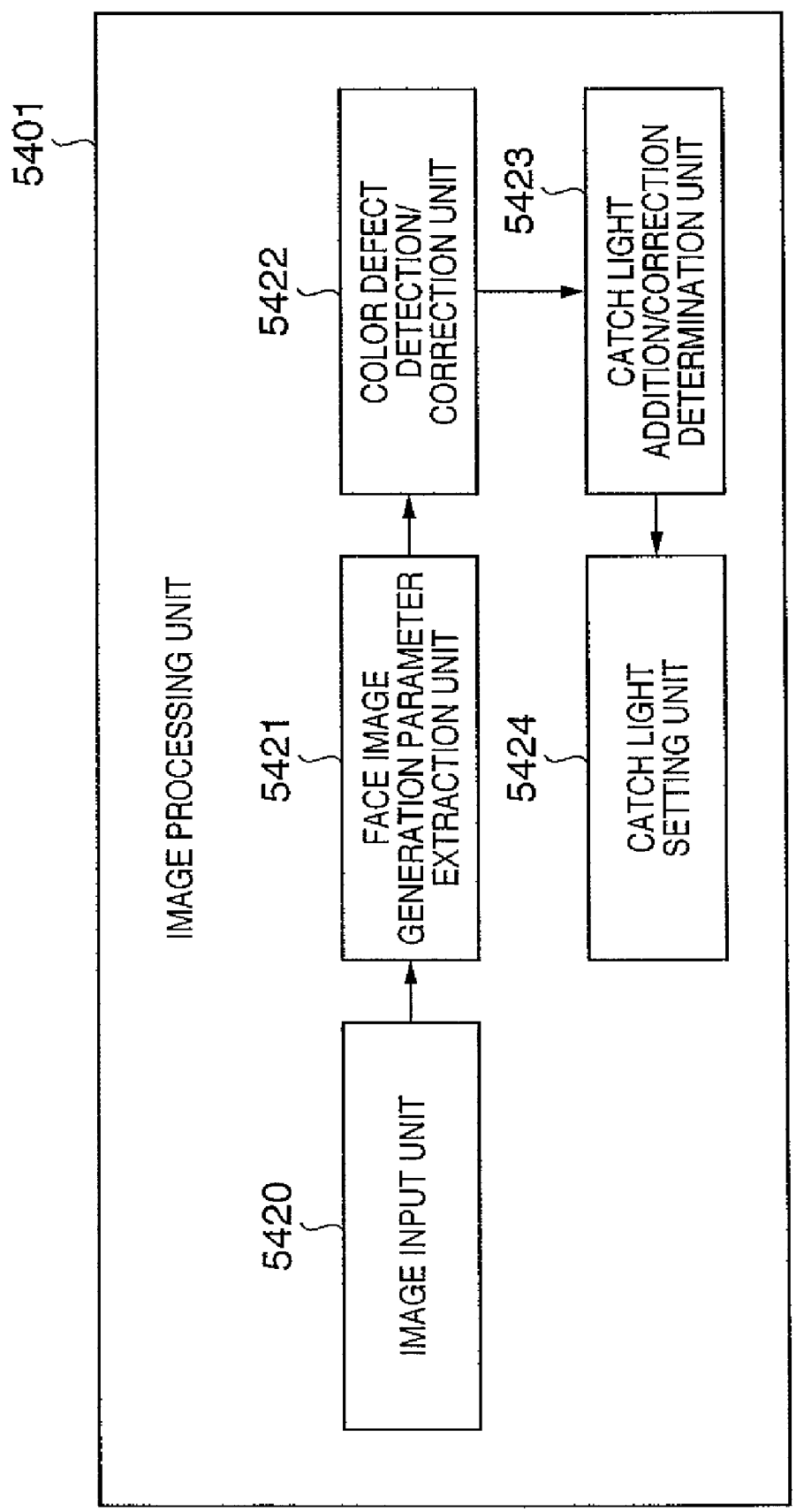
FIG. 32 is a block diagram showing the detailed arrangement of an image processing unit.

FIG. 32 is a block diagram showing the detailed arrangement of the image processing unit 5401. As shown in FIG. 32, the image processing unit 5401 includes an image input unit 5420 which reads out a digital image from the image primary storage unit 5413, a face image generation parameter extraction unit 5421, color defect detection/correction unit 5422, catch light addition/correction determination unit 5423, and catch light setting unit 5424. This will be described below in detail.

The imaging optical system 5410 of the image sensing unit 5400 is, e.g., a lens. The solid-state image sensing element 5411 is, e.g., a CCD which converts a sensed image into an electrical signal. The electrical signal obtained by the solid-state image sensing element 5411 is A/D-converted by the video signal processing circuit 5412. The digital image obtained by the video signal processing circuit 5412 is stored in a storage medium by the image primary storage unit 5413. As the storage medium, for example, a flash memory is used. However, the present invention is not limited to a flash memory.

The image input unit 5420 of the image processing unit 5401 reads out the digital image from the image primary storage unit 5413.

The face image generation parameter extraction unit 5421 analyzes the image data by executing the same processing as in the third and fourth embodiments for the digital image obtained by the image input unit 5420.

When it is determined by using face image generation parameters that a red component region with a predetermined value or more is included in the eye region, the color defect detection/correction unit 5422 determines that the region is a red-eye and corrects it, as in the fourth embodiment. For example, the following coercion method can be used in addition to the method of the fourth embodiment.

Figure 33:
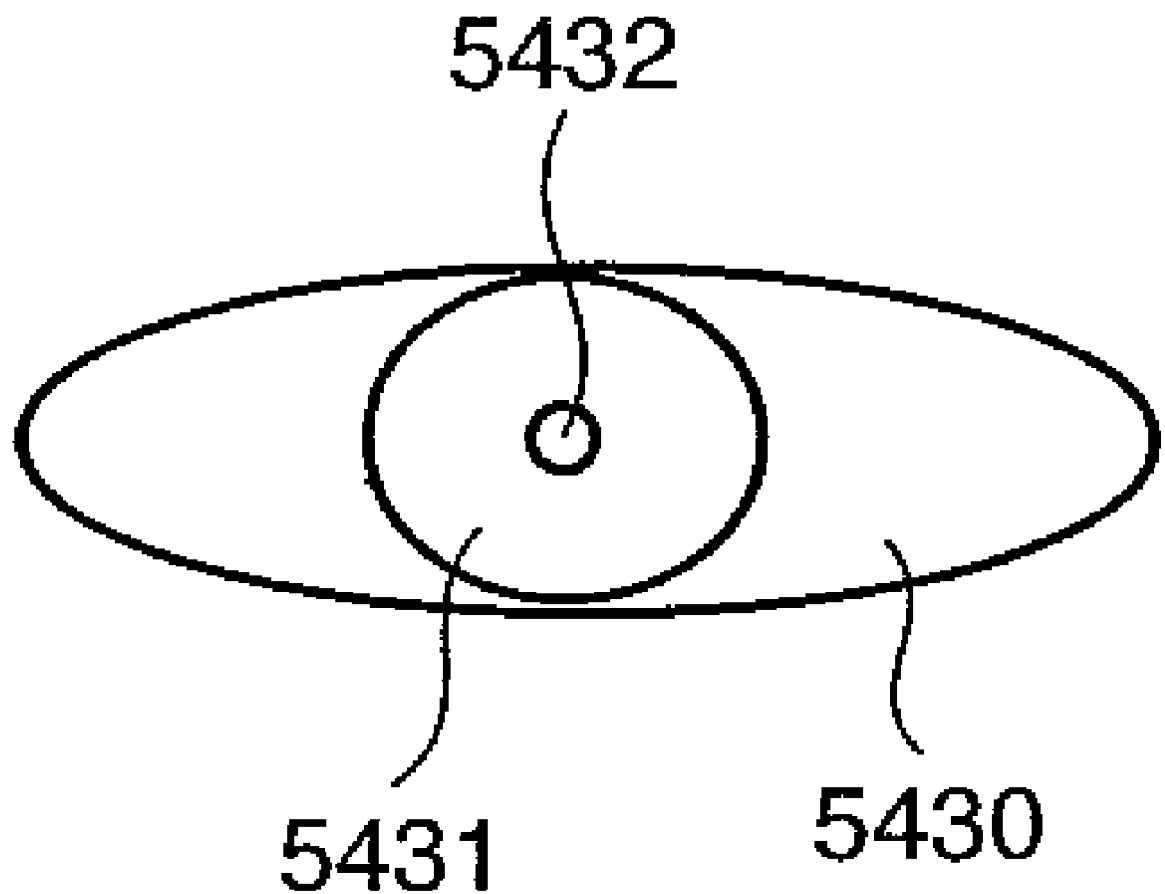
FIG. 33 is a view showing an eye region including a lightness region with a predetermined value or more and a pupil/iris region when a color defect is present.

FIG. 33 is a view showing an eye region 5430 including a lightness region 5432 with a predetermined value or more and a pupil/iris region 5431 when a color defect is present. As shown in FIG. 33, in the pupil/iris region 5431, pixels having the lightness region 5432 with a predetermined value (e.g., a lightness value of 200) or more are detected. A region excluding the region having the lightness region with the predetermined value or more is corrected.

Figure 34:
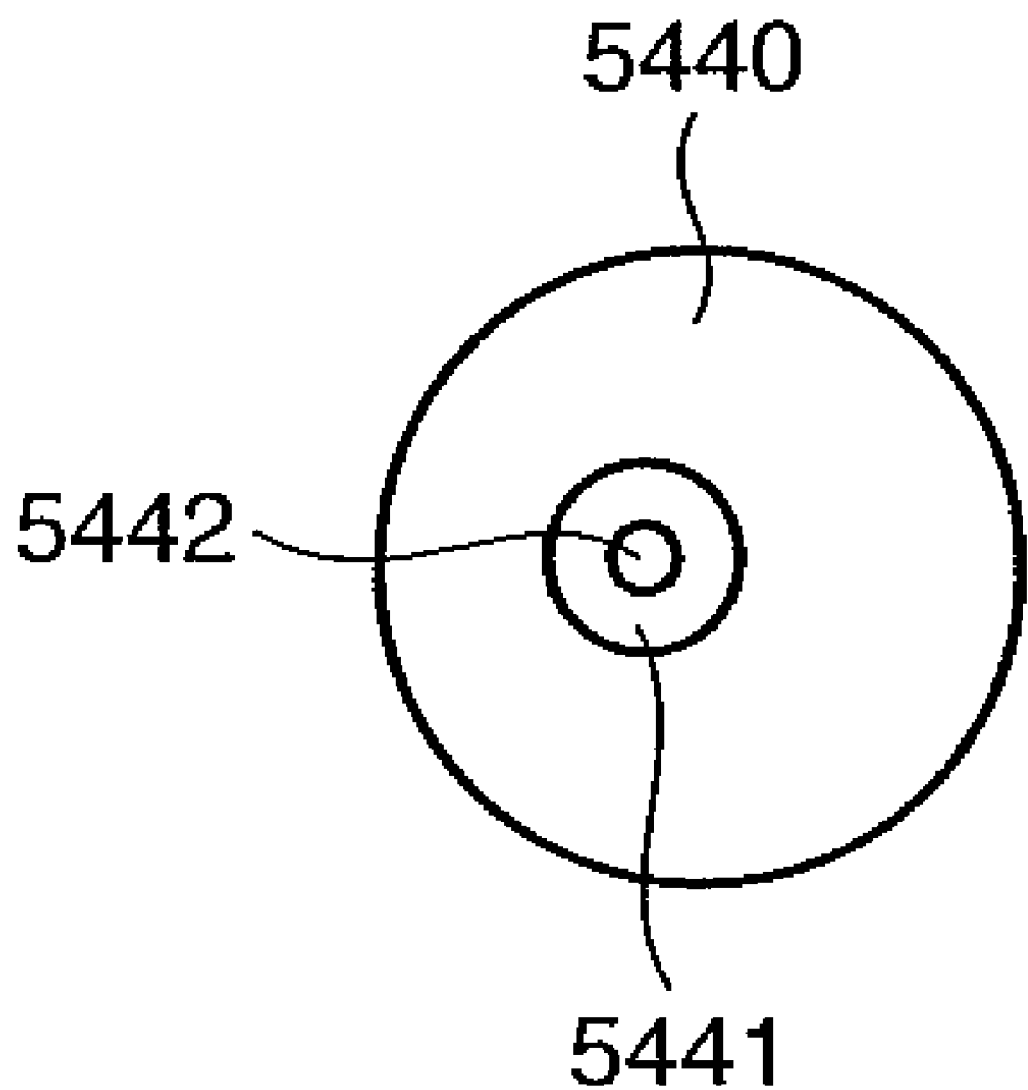
FIG. 34 is a view showing a desired catch light size and the detected lightness with a predetermined value in the pupil/iris region.

FIG. 34 is a view showing a desired catch light size 5441 and a detected lightness region 5442 with a predetermined value or more in a pupil/iris region 5440.

When the region 5442 having a predetermined lightness value (e.g., a lightness value of 200) or more in the pupil/iris region 5440 shown in FIG. 34 is equal to or smaller than the desired catch light size 5441 (for example, when the diameter of the region with a lightness value of 200 is ⅕ of that of the pupil/iris region) determined by using the face image generation parameters, the catch light addition/correction determination unit 5423 determines that the catch light range needs to be extended in the region after color correction by the color defect detection/correction unit 5422. The desired catch light size may be determined either on the basis of the pupil/iris region as one of the image generation parameters or by using another parameter.

If the color information in the region where the catch light is extracted is different from a desired color (e.g., a white color component), it is determined as needed that the color in the catch light region must be corrected.

The catch light setting unit 5424 sets addition or correction of catch light by using the central position and color information of the lightness region 5442 with a predetermined value (e.g., a lightness value of 200) or more obtained by the catch light addition/correction determination unit 5423 and the catch light size (e.g., a circle having a diameter of ⅕ the size of the pupil/iris region) determined on the basis of the size of the pupil/iris region as one of the face image generation parameters.

The catch light size may be determined by using the pupil region or iris region, a region including both regions, or the size of the face or eye obtained from the face image generation parameters. The shape may be a circle or another shape. As the catch light color to be used in correction, the color information in the lightness region with the predetermined value or more, which is obtained by the catch light addition/correction determination unit 5423, may be used. Alternatively, color information (e.g., white) prepared in advance may be used. The catch light need not always be extended. If the size of the detected catch light is larger than a reference value (e.g., a gold-eye), the range is reduced.

In correction processing in catch light setting, the size and color of catch light need not be corrected totally.

Figure 35:
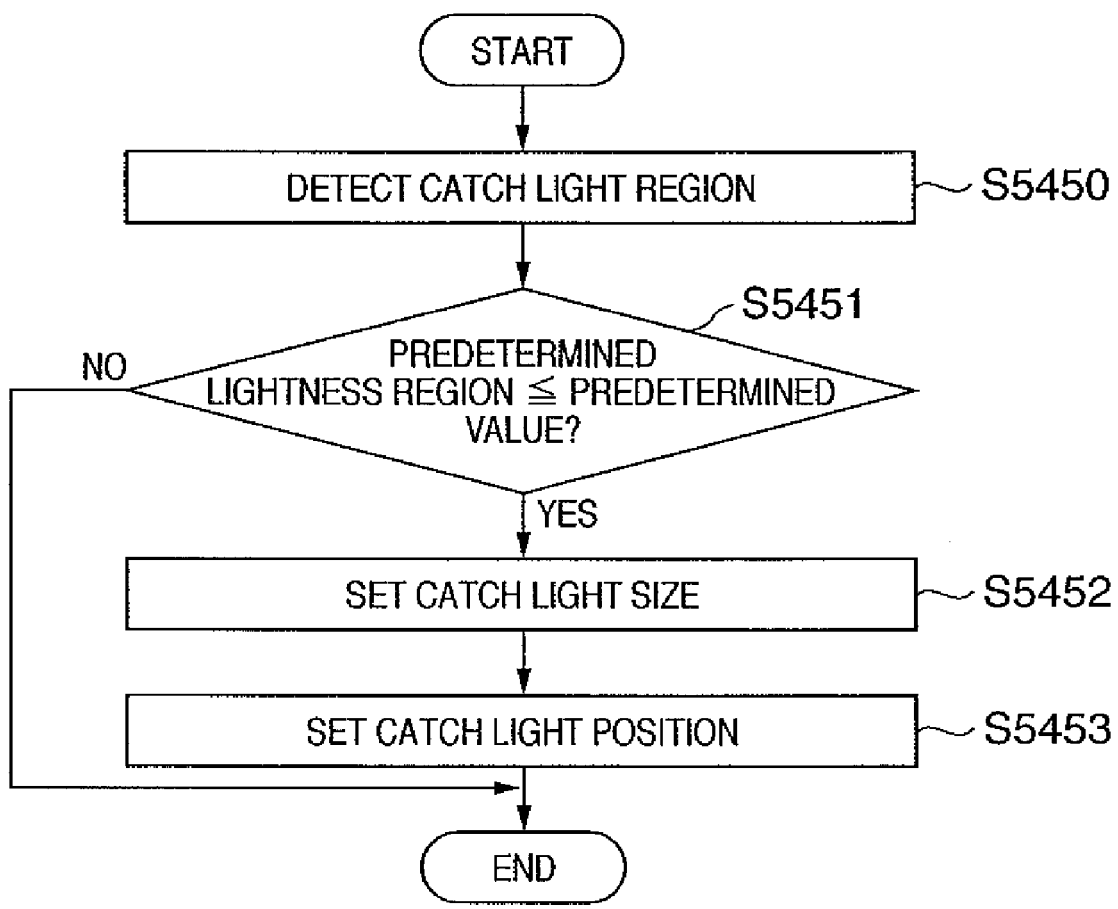
FIG. 35 is a flowchart showing the processing procedures of the image processing unit according to the fifth embodiment.

FIG. 35 is a flowchart showing the processing procedures of the image processing unit 5401 according to the fifth embodiment from catch light region detection to catch light setting.

In step S5450, a catch light region is extracted. in step S5451, when the predetermined lightness region has a predetermined value or less, it is determined that catch light setting needs to be done. In step S5452, the catch light size is set. In step S5453, the catch light position is set. If it is determined in step S5451 that the predetermined lightness region does not have the predetermined value or less, it is determined that catch light setting need not be done, and no processing is executed.

The image secondary storage unit 5402 stores the digital image corrected by the image processing unit 5401 in a storage medium. As the storage medium, for example, a flash memory can be used. The image primary storage unit 5413 and image secondary storage unit 5402 may use the same storage medium or different storage media.

Sixth Embodiment

Figure 36:
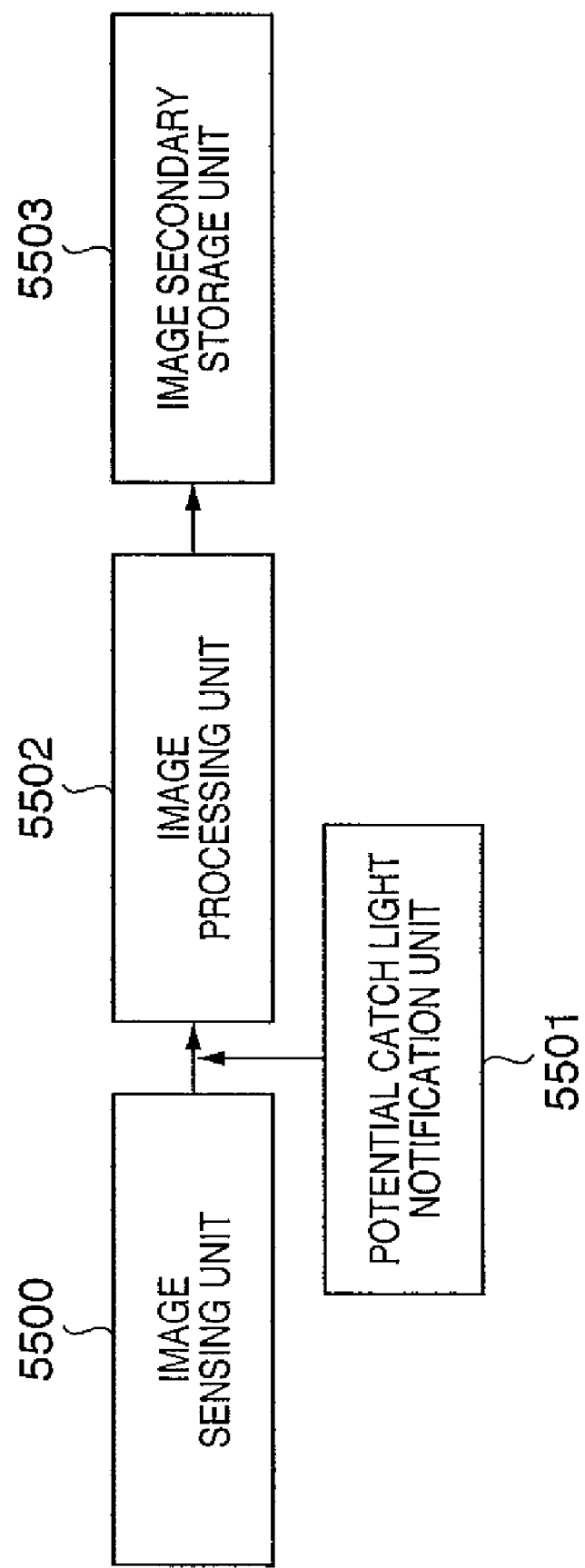
FIG. 36 is a block diagram showing the functional arrangement of an image sensing apparatus according to the sixth embodiment.

FIG. 36 is a block diagram showing the functional arrangement of an image sensing apparatus according to the sixth embodiment. The image sensing apparatus includes a potential catch light notification unit 5501, image processing unit 5502, image secondary storage unit 5503, and image sensing unit 5500 including a flash emitting unit.

Figure 37:
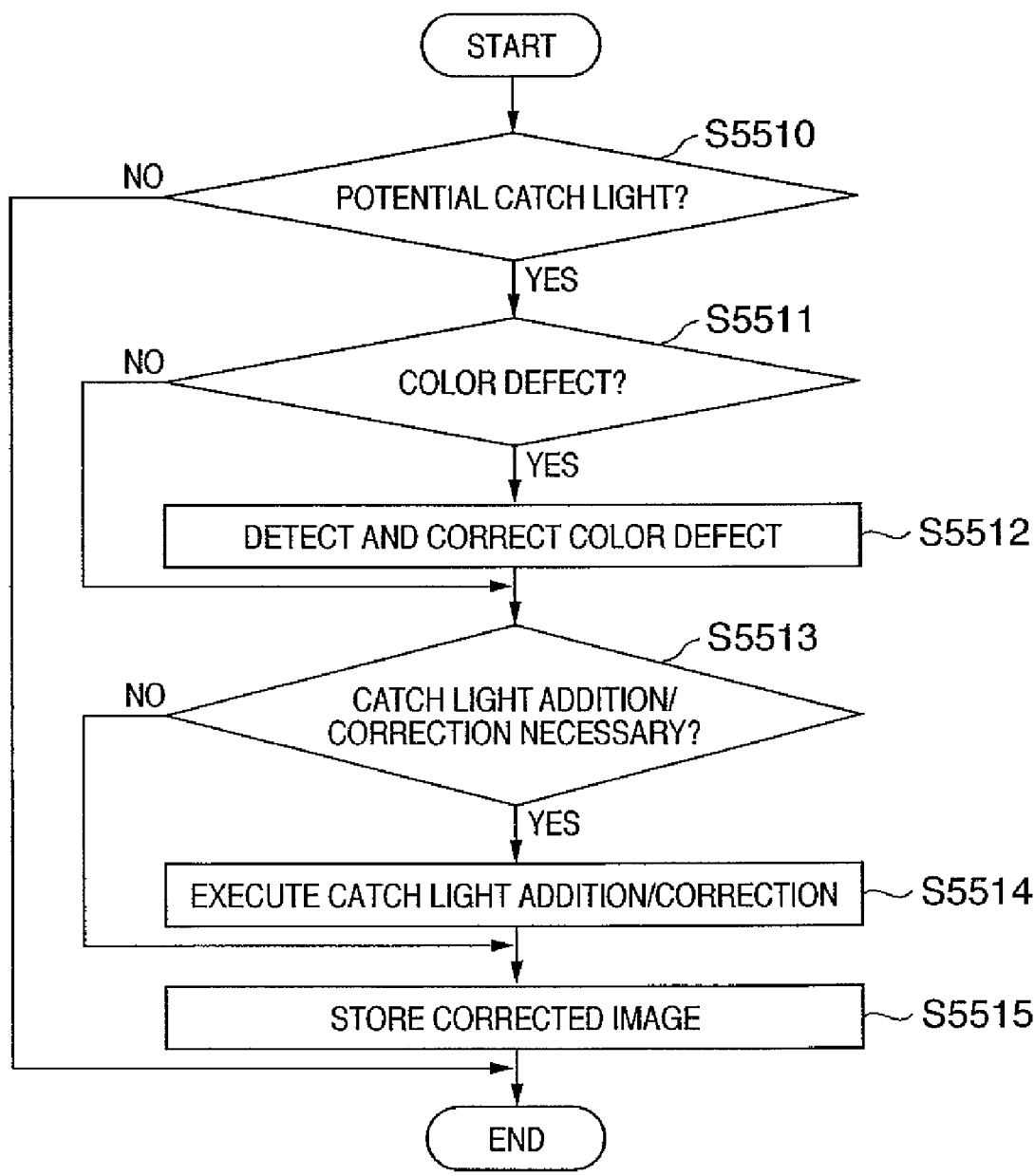
FIG. 37 is a flowchart showing the processing procedures according to the sixth embodiment.

The image sensing unit 5500, image processing unit 5502, and image secondary storage unit 5503 execute the same processing as in the fifth embodiment. The arrangement of the image processing unit 5502 is the same as in the fifth embodiment. As described in the fifth embodiment, the image sensing unit 5500 includes a primary storage medium. As the primary and secondary storage media, for example, a flash memory can be used. As the primary storage medium and secondary storage medium, the same storage medium may be used. FIG. 37 is a flowchart showing the processing procedures according to the sixth embodiment. This will be descried below in detail.

After a digital image is obtained by the image sensing unit 5500, if the potential catch light notification unit 5501 which detects an event indicating flash emission by the image sensing unit 5500 determines in step S5510 that potential catch light is present, image analysis described in the third embodiment is executed. In step S5511, a color defect is detected by using face image generation parameters obtained by image analysis. If a color defect is detected in step S5511, color defect correction processing is executed in step S5512.

If no color defect is detected in step S5511, the flow advances to step S5513 without any processing. In step S5513, catch light addition/correction processing is determined. If catch light addition or correction processing is necessary, catch light addition/correction processing is executed in step S5514. If it is determined in step S5513 that catch light addition or correction processing need not be executed, the flow advances to step S5515. In step S5515, the image which has undergone the color defect correction processing and catch light addition/correction processing is stored in a recording medium.

As described above, when the above-described catch light setting function is prepared in the image sensing apparatus, an image sensing apparatus capable of setting catch light in an eye region of a sensed face image can be implemented.

Seventh Embodiment

Figure 38:
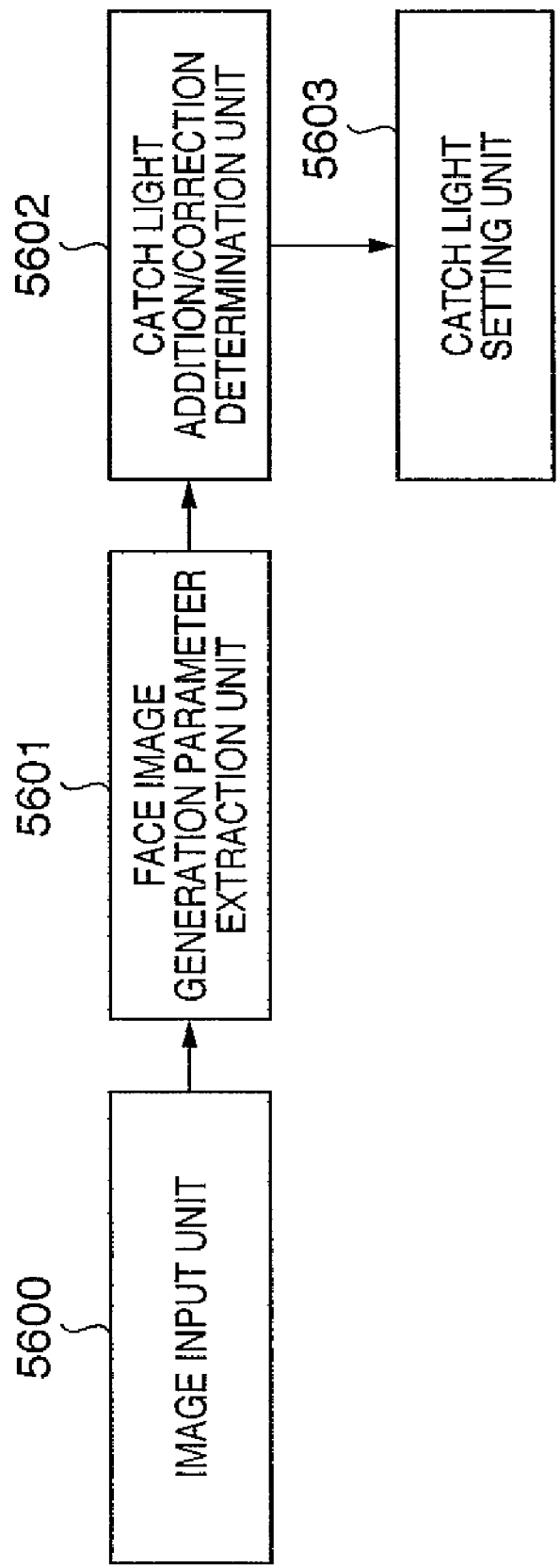
FIG. 38 is a block diagram showing the functional arrangement of an image processing apparatus according to the seventh embodiment.

FIG. 38 is a block diagram showing the functional arrangement of an image processing apparatus according to the seventh embodiment. The image processing apparatus includes an image input unit 5600, face image generation parameter extraction unit 5601, catch light addition/correction determination unit 5602, and catch light setting unit 5603.

The image input unit 5600 and face image generation parameter extraction unit 5601 execute the same operation as in the third embodiment.

By using the average lightness value of the entire image as a face image generation parameter obtained by the face image generation parameter extraction unit 5601, if it is determined that the average lightness value of the entire image is a predetermined value or less (e.g., an average lightness value of 50 or less), the catch light addition/correction determination unit 5602 determines that catch light is necessary.

The catch light addition/correction determination unit 5602 may execute the determination by using either the average lightness value of the entire image or any other feature. For an image for which the catch light addition/correction determination unit 5602 determines that catch light is necessary, it is determined by the method described in the fifth embodiment using the parameters calculated by the face image generation parameter extraction unit 5601 whether catch light is present in the pupil/iris region.

When the catch light addition/correction determination unit 5602 determines that catch light needs to be set, and no catch light is present, or the size, position or color of catch light is inappropriate, the catch light setting unit 5603 executes catch light setting by using the method of, e.g., the third or fifth embodiment.

Figure 39:
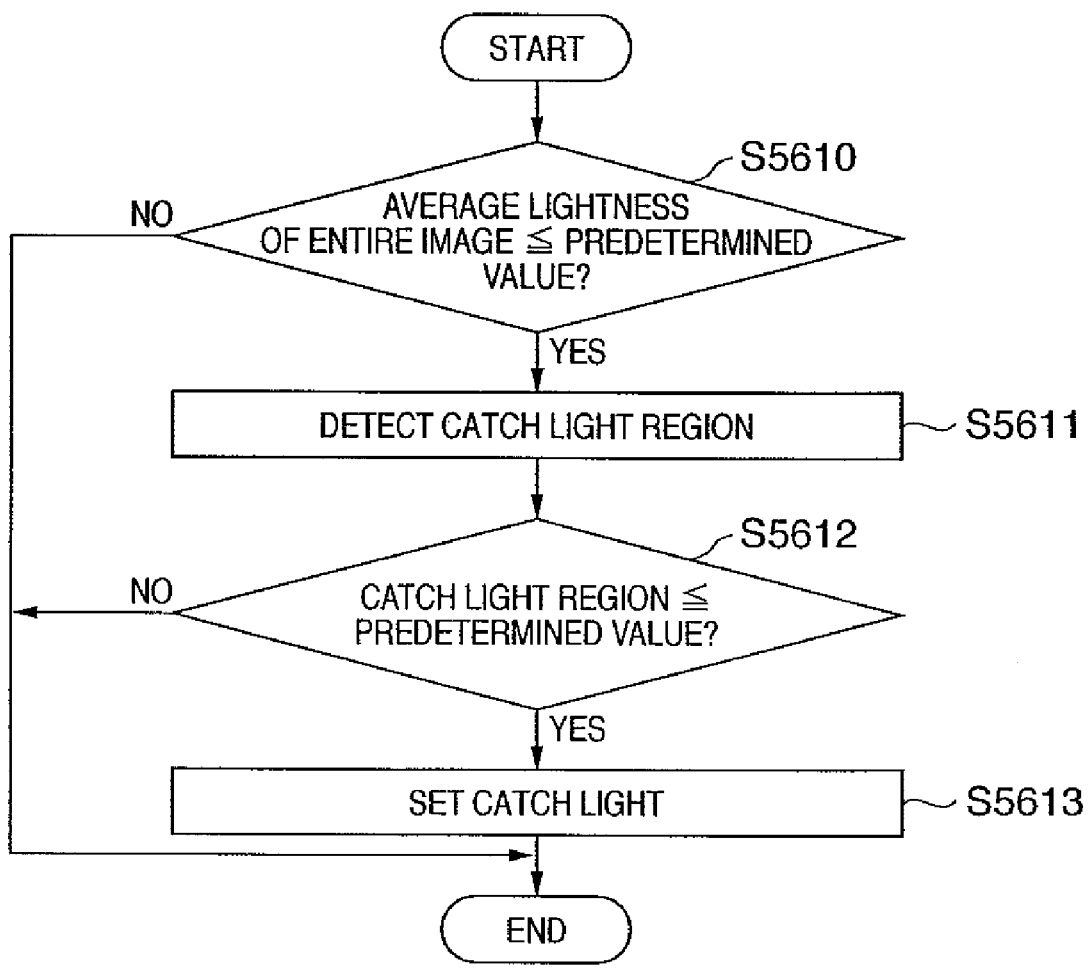
FIG. 39 is a flowchart showing the processing procedures according to the seventh embodiment.

FIG. 39 is a flowchart showing the processing procedures. If it is determined in step S5610 that the average lightness of the entire image has a predetermined value (e.g., an average lightness value of 50) or less, ins step S5611, a catch light region is detected. If it is determined in step S5612 that the size of the catch light region has a predetermined value (e.g., ⅕ the pupil/iris region) or less, it is determined that catch light setting is necessary. In steps 5613, catch light setting is done. However, if it is determined in step S5612 that the size of the catch light region has the predetermined value or more, it is determined that catch light setting is unnecessary, and no catch: light setting is done.

Eighth Embodiment

Figure 40:
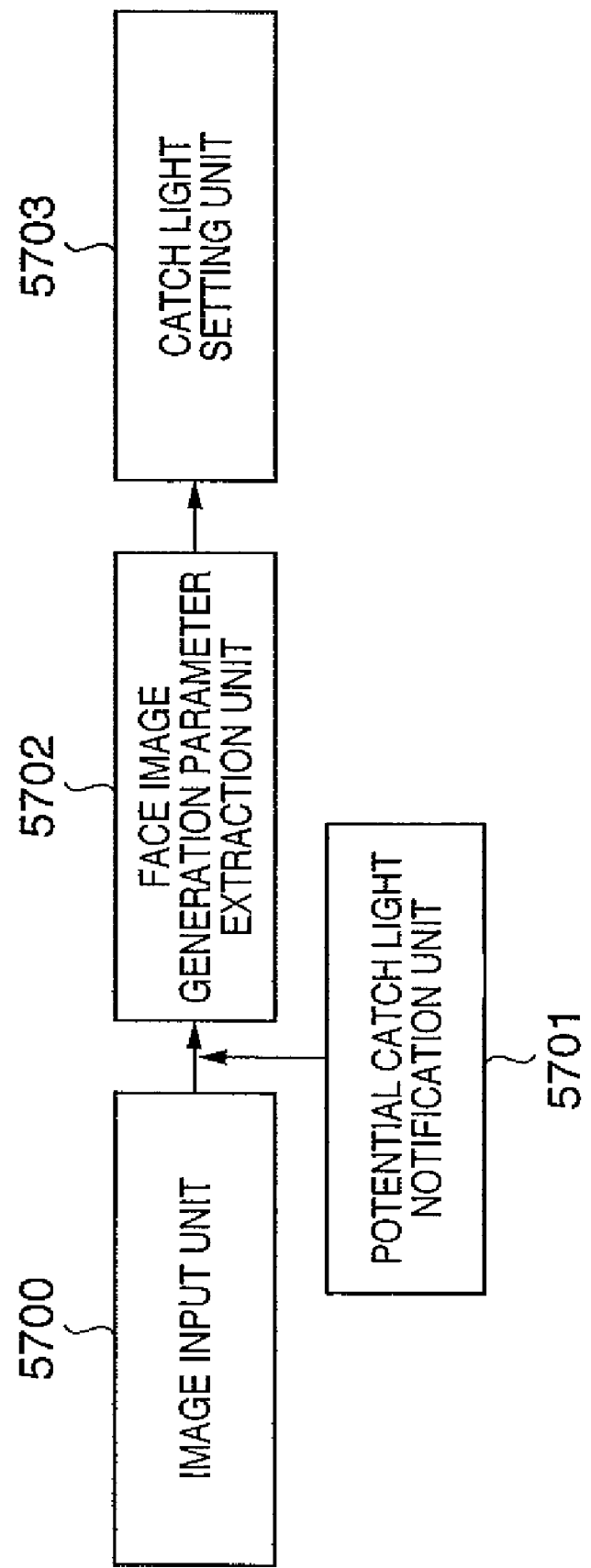
FIG. 40 is a block diagram showing the functional arrangement of an image processing apparatus according to the eighth embodiment.

FIG. 40 is a block diagram showing the functional arrangement of an image processing apparatus according to the eighth embodiment. The image processing apparatus includes an image input unit 5700, potential catch light notification unit 5701, image generation parameter extraction unit 5702, and catch light setting unit 5703.

The image input unit 5700 receives a digital image as an input image, as in the third to sixth embodiments. The potential catch light notification unit 5701 notifies the user of generation of catch light. This module generates a notification upon acquiring, e.g., information representing flash emission or information representing the photographer selects a catch light setting mode instead of determining generation of catch light from image information. The catch light setting unit 5703 executes the same operation as in the fifth or sixth embodiment.

Figure 41:
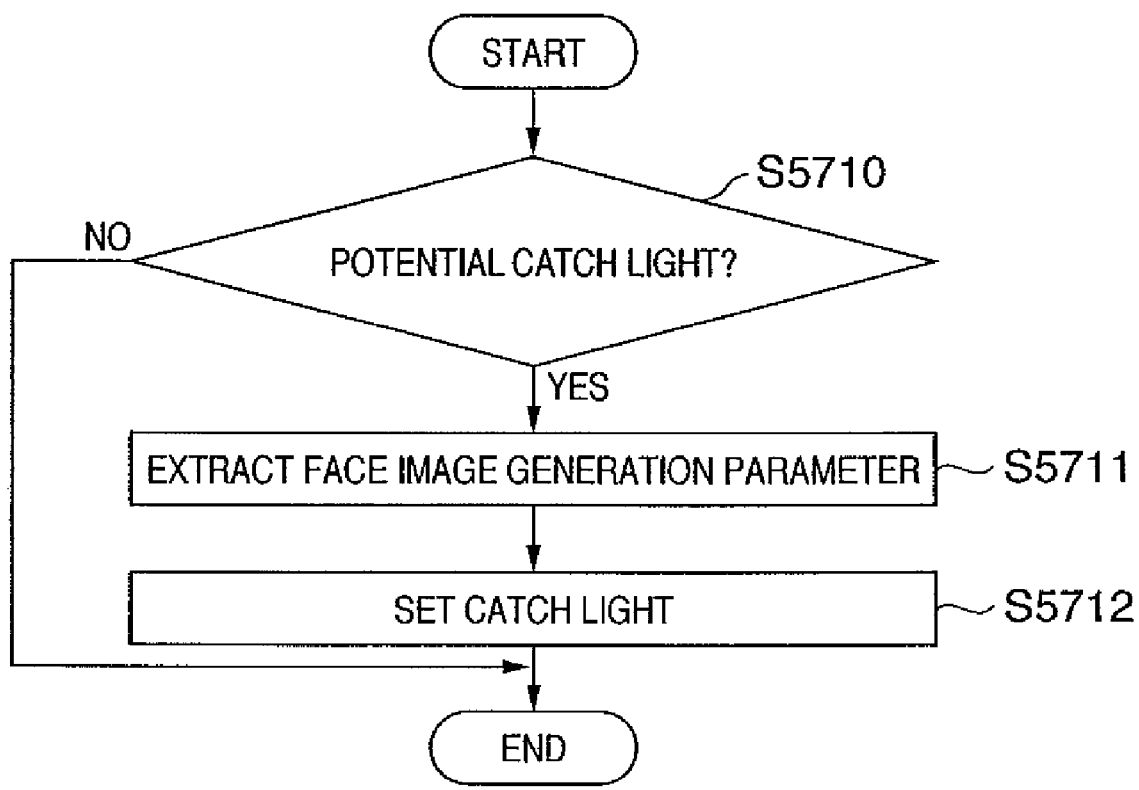
FIG. 41 is a flowchart showing the processing procedures according to the eighth embodiment.

FIG. 41 is a flowchart showing the processing procedures according to the eighth embodiment. If a notification representing that catch light is generated or a catch light setting mode is selected is received in potential catch light notification step S5710, face image generation parameters are extracted in step S5711. Catch light setting is done by using the face image generation parameters in step S5712. If no notification representing that catch light is generated is received in step S5710, no processing is executed.

Ninth Embodiment

Figure 42:
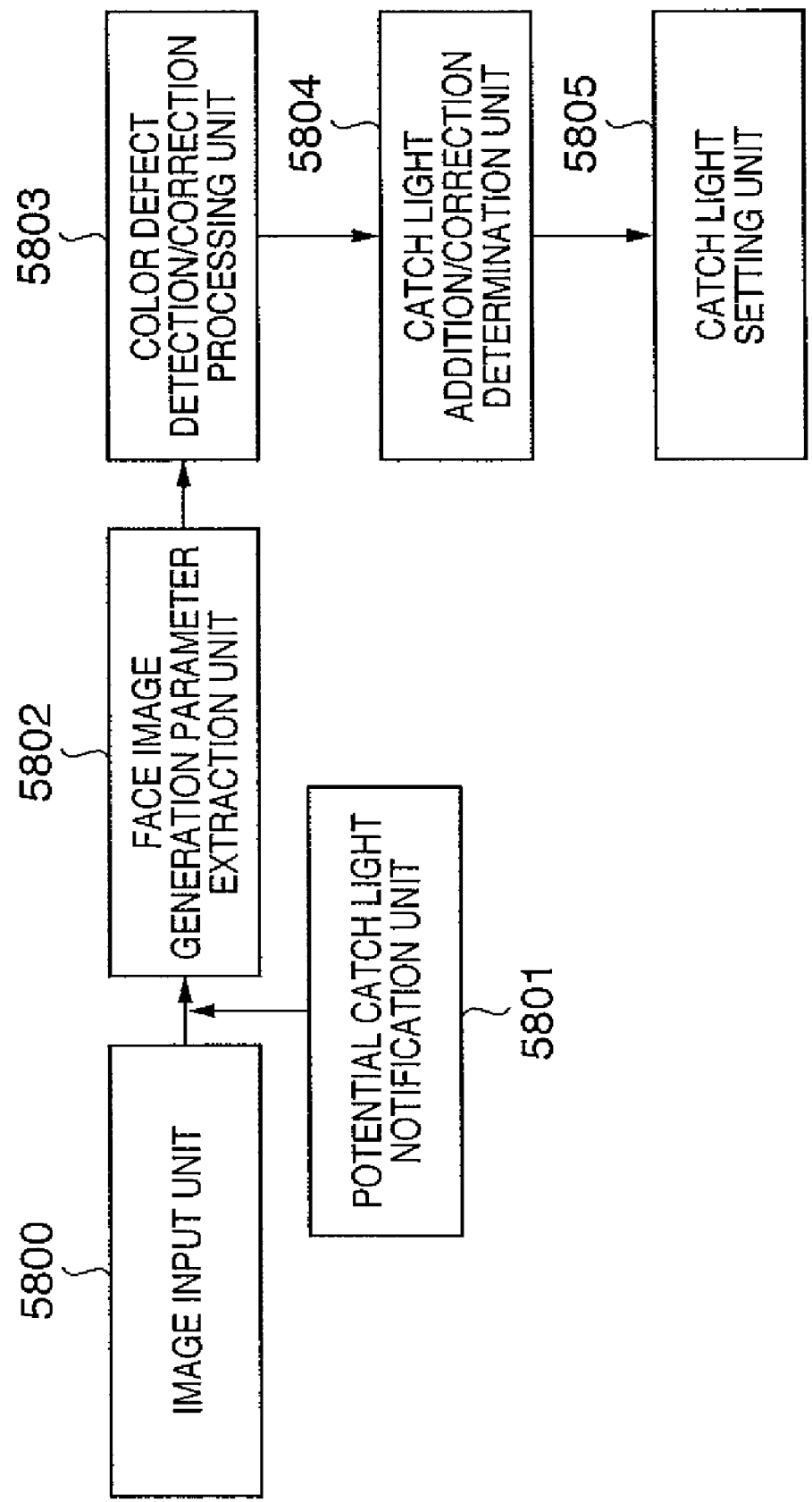
FIG. 42 is a block diagram showing the functional arrangement of an image processing apparatus according to the ninth embodiment.

FIG. 42 is a block diagram showing the functional arrangement of an image processing apparatus according to the ninth embodiment. The image processing apparatus includes an image input unit 5800, potential catch light notification unit 5801, color defect detection/correction processing unit 5803, catch light addition/correction determination unit 5804, and catch light setting unit 5805.

The potential catch light notification unit 5801 generates a notification upon acquiring, e.g., information representing flash emission or information representing the photographer selects a catch light setting mode instead of determining generation of catch light from image information, as in the eighth embodiment.

Figure 43:
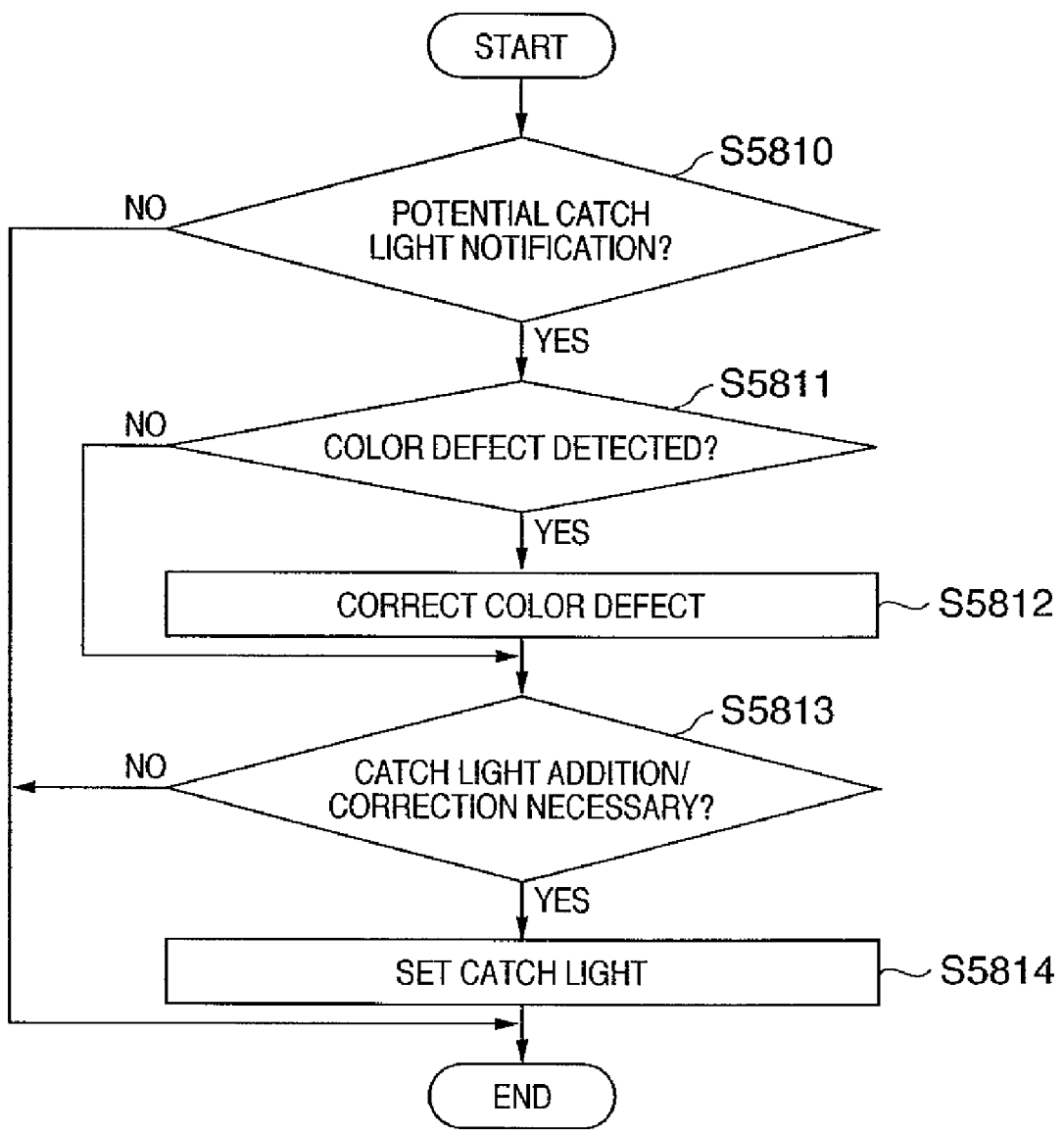
FIG. 43 is a flowchart showing the processing procedures according to the ninth embodiment.

FIG. 43 is a flowchart showing the processing procedures according to the ninth embodiment.

When a notification representing potential catch light is received in step S5801, a color defect in an eye region is detected in step S5811 by using face image generation parameters. If it is determined that a color defect is present, color defect correction processing is executed in step S5812. Then, in step S5813, the necessity of catch light addition/correction is determined.

If no color defect is detected in step S5811, the necessity of catch light addition/correction is determined in step S5813 without executing color defect correction processing in step S5812. If it is determined in step S5813 that catch light addition/correction is necessary, catch light is added/corrected in step S5814. If no notification representing potential catch light is received in step S5801, or it is determined in step S5813 that catch light addition/correction is unnecessary, no processing is executed.

The hardware configuration of the image processing apparatus according to this embodiment is the same as that shown in FIG. 7. In this case, a program or data to cause a CPU 71 to implement the functions of the units shown in FIG. 8 is stored in a hard disk drive device (HDD) 76. This image processing apparatus is used as part of an image sensing apparatus or connected to an image sensing apparatus to execute the above-described correction processing.

According to the above-described embodiments, the presence/absence of catch light in an image after color defect correction is determined. When no catch light is present, catch light setting is automatically done by using face image generation parameters. With this processing, the variation in accuracy of image correction by manual operation is reduced, and a more natural image can be created.

For an image after color defect correction, it is determined whether the size, position, and color of catch light are appropriate, and the catch light is corrected by using face image generation parameters. With this processing, the variation in accuracy of image correction by manual operation is reduced, and a more natural image can be created.

After the situation which causes catch light in an input image is determined, the presence/absence of catch light is determined. If no catch light is present, catch light setting is done by using face image generation parameters. With this processing, the variation in accuracy of image correction by manual operation is reduced, and a more natural image can be created.

After the situation which causes catch light in an input image is determined, it is determined whether the size, position, and color of catch light are appropriate, and the catch light is corrected by using face image generation parameters. With this processing, the variation in accuracy of image correction by manual operation is reduced, and a more natural image can be created.

Other Embodiment

The object of the present invention can also be achieved by supplying a recording medium (or storage medium) which records software program codes for implementing the functions of the above-described embodiments to a camera or computer and causing the CPU or MPU of the camera or computer to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the camera or computer but also when the operating system (OS) running on the camera performs part or all of actual processing on the basis of the instructions of the program codes.

The functions of the above-described embodiments are also implemented when the program codes read out from the recording medium are written in the memory of a function expansion board inserted into the camera or computer or a function expansion unit connected to the camera or computer, and the CPU of the function expansion board or function expansion unit performs part or all of actual processing on the basis of the instructions of the program codes.

When the present invention is applied to the recording medium, it stores program codes corresponding to the above-described flowcharts.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-223577 filed on Jul. 30, 2004 and Japanese Patent Application No. 2004-223579 filed on Jul. 30, 2004, the entire contents of which are hereby incorporated by reference herein.

The invention claimed is:

1. An image processing method comprising:
an input step of inputting an image;
a poor pupil hue quality region extraction step of extracting a poor pupil hue quality region from the image;
a high brightness region extraction step of extracting a high brightness region from the poor pupil hue quality region;
a red-eye region correction step of determining, as a red-eye region, a region obtained by excluding the high brightness region from the poor pupil hue quality region and correcting the red-eye region; and
a high brightness region correction step of correcting the high brightness region by using a method different from that in the red-eye region correction step.

2. The method according to claim 1, wherein
the poor pupil hue quality region extraction step comprises steps of extracting, from a pupil region, a red-eye pixel in a pixel component range unique to a red-eye, extracting, from the pupil region, a high brightness pixel having a brightness value of not less than a predetermined value, and setting an oval region or a circular region which includes the red-eye pixel and the high brightness pixel, and
a range in the oval region or the circular region, which is included in the pupil region, is extracted as the poor pupil hue quality region.

3. The method according to claim 2, wherein as the pixel component range unique to the red-eye, a range of at least one of a hue, chroma, brightness, and chromaticity is used.

4. The method according to claim 2, wherein in the high brightness region extraction step, a result of the step of extracting the high brightness pixel is used.

5. The method according to claim 2, wherein the predetermined value used in extracting the high brightness pixel is an upper limit value of a brightness value of a pixel which can be regarded as a black eye.

6. The method according to claim 1, wherein in the red-eye region correction step, correction is performed to reduce a brightness or a brightness and chroma of a pixel in the red-eye region.

7. The method according to claim 1, wherein
the red-eye region correction step comprises a step of generating a correction template by giving a predetermined parameter to an iris template prepared in advance, and
the red-eye region is corrected on the basis of the correction template.

8. The method according to claim 1, wherein the high brightness region correction step comprises an area calculation step of calculating an area of the high brightness region and a gold-eye determination step of determining on the basis of the calculated area whether a gold-eye has occurred in the high brightness region.

9. The method according to claim 8, further comprising:
a division step of, when it is determined in the gold-eye determination step that a gold-eye has occurred in the high brightness region, dividing the high brightness region into a gold-eye region and a catch light region, and
a step of, when it is not determined that a gold-eye has occurred in the high brightness region, determining the high brightness region as a catch light region.

10. The method according to claim 9, wherein the division step comprises steps of detecting a pixel having a maximum brightness value from pixels in the high brightness region, and determining a predetermined catch light region in the high brightness region on the basis of a position of the detected pixel having the maximum brightness value, and
a region obtained by excluding the determined catch light region from the high brightness region is determined as the gold-eye region.

11. The method according to claim 9, further comprising a gold-eye region correction step of correcting the divided gold-eye region.

12. The method according to claim 11, wherein in the gold-eye region correction step, correction is performed to reduce a brightness or a brightness and chroma of a pixel in the gold-eye region.

13. The method according to claim 11, wherein
the gold-eye region correction step comprises a step of generating a correction template by giving a predetermined parameter to an iris template prepared in advance, and
the gold-eye region is corrected on the basis of the correction template.

14. The method according to claim 9, further comprising a catch light region correction step of correcting the divided catch light region.

15. The method according to claim 14, wherein in the catch light region correction step, correction is performed to reduce a chroma of a pixel in the catch light region.

16. The method according to claim 14, wherein
the catch light region correction step comprises a step of determining a correction color by using at least one of a hue, chroma, brightness, and chromaticity of a pixel in a white-of-eye region, and
a pixel in the catch light region is corrected on the basis of the correction color.

17. The method according to claim 7, wherein the predetermined parameter is at least one of a size of a correction target, and a hue, chroma, brightness, and chromaticity of a pixel in a region obtained by excluding the poor pupil hue quality region from a pupil region.

18. The method according to claim 1, wherein in the red-eye region correction step, correction is executed by blurring a boundary of a correction region.

19. The method according to claim 11, wherein in the gold-eye region correction step, correction is executed by blurring a boundary of a correction region.

20. The method according to claim 14, wherein in the catch light region correction step, correction is executed by blurring a boundary of a correction region.

21. The method according to claim 1, wherein in the red-eye region correction step, a correction method is selected in accordance with a size of a correction target.

22. The method according to claim 11, wherein in the gold-eye region correction step, a correction method is selected in accordance with a size of a correction target.

23. The method according to claim 14, wherein in the catch light region correction step, a correction method is selected in accordance with a size of a correction target.

24. The method according to claim 17, wherein the size of the correction target is a size of a face of a person with a poor pupil hue quality.

25. The method according to claim 17, wherein the size of the correction target is a size of an eye of a person with a poor pupil hue quality.

26. An image processing apparatus comprising:
input means for inputting an image;
poor pupil hue quality region extraction means for extracting a poor pupil hue quality region from the image;
high brightness region extraction means for extracting a high brightness region from the extracted poor pupil hue quality region;
red-eye region correction means for determining, as a red-eye region, a region obtained by excluding the high brightness region from the poor pupil hue quality region and correcting the red-eye region; and
high brightness region correction means for correcting the high brightness region by using a method different from that of said red-eye region correction means.

27. An image sensing apparatus comprising:
image generation means for generating an object image; and
an image processing apparatus of claim 26,
wherein a poor pupil hue quality in the object image generated by said image generation means is corrected by said image processing apparatus.

28. The apparatus according to claim 27, further comprising:
face detection means for detecting a face from the object image, and
means for limiting a correction processing application range in the object image on the basis of a face detection result by said face detection means.

29. The apparatus according to claim 27, further comprising:
photometry means for measuring a brightness of an object,
flashlight use determination means for determining whether or not a flashlight is to be used on the basis of the brightness signal of the object from said photometry means,
flashlight generation means, and
means for, when said flashlight use determination means determines that the flashlight is to be used, issuing an activation instruction to said flashlight generation means and said image processing apparatus.

30. A non-transitory computer-readable medium storing a computer program instructing a computer to execute an image processing method comprising:

an input step of inputting an image;

a poor pupil hue quality region extraction step of extracting a poor pupil hue quality region from the image;

a high brightness region extraction step of extracting a high brightness region from the poor pupil hue quality region;

a red-eye region correction step of determining, as a red-eye region, a region obtained by excluding the high brightness region from the poor pupil hue quality region and correcting the red-eye region; and a high brightness region correction step of correcting the high brightness region by using a method different from that in the red-eye region correction step.

* * * * *